US007463569B2

(12) United States Patent
Nishiwaki et al.

(10) Patent No.: US 7,463,569 B2
(45) Date of Patent: Dec. 9, 2008

(54) OPTICAL DISK APPARATUS WITH A WAVELENGTH PLATE HAVING A TWO-DIMENSIONAL ARRAY OF BIREFRINGENT REGIONS

(75) Inventors: Seiji Nishiwaki, Kobe (JP); Kazuo Momoo, Hirakata (JP); Jun-ichi Asada, Kobe (JP); Kenji Otani, Ikoma (JP); Yusuke Kanda, Settsu (JP)

(73) Assignee: Panasonic Corporation, Kadoma (JP)

( * ) Notice: Subject to any disclaimer, the term of this patent is extended or adjusted under 35 U.S.C. 154(b) by 650 days.

(21) Appl. No.: 11/112,998

(22) Filed: Apr. 22, 2005

(65) Prior Publication Data
US 2005/0237902 A1 Oct. 27, 2005

(30) Foreign Application Priority Data
Apr. 23, 2004 (JP) ............................. 2004-127855
Apr. 28, 2004 (JP) ............................. 2004-133108

(51) Int. Cl.
*G11B 7/00* (2006.01)
(52) U.S. Cl. ............................. 369/112.17; 369/112.1
(58) Field of Classification Search .................. None
See application file for complete search history.

(56) References Cited

U.S. PATENT DOCUMENTS 5,687,153 A 11/1997 Komma et al.
6,324,149 B1* 11/2001 Mifune et al. .......... 369/112.01
6,775,221 B1* 8/2004 Fukumoto ............... 369/112.16
7,099,085 B2* 8/2006 Yamada et al. .............. 359/569
7,154,837 B2* 12/2006 Kasazumi et al. ....... 369/112.02
7,254,107 B2* 8/2007 Wada et al. ............ 369/112.02

FOREIGN PATENT DOCUMENTS

JP 06-131674 5/1994
JP 2000-132848 12/2000

OTHER PUBLICATIONS

Chinese Office Action for corresponding Application No. 200510067656.6, dated Dec. 14, 2007.

* cited by examiner

*Primary Examiner*—Peter Vincent Agustin
(74) *Attorney, Agent, or Firm*—Renner, Otto, Boisselle & Sklar, LLP

(57) ABSTRACT

It is intended to provide an optical disk apparatus which detects a light amount greater than zero even when used in conjunction with an optical disk substrate having a large birefringence, so that it is possible to properly read a signal without errors and properly perform optical disk controls. The optical disk apparatus includes: a light source for emitting light; an objective lens for converging the light onto a signal surface of an optical disk; a polarized beam diffraction element for diffracting the light reflected from the optical disk; a photodetector for detecting the light diffracted from the polarized beam diffraction element; and a wavelength plate disposed between the optical disk and the polarized beam diffraction element. The wavelength plate has a two-dimensional array of a plurality of birefringent regions including first and second regions, the first and second regions differing in birefringent phase difference and/or optic axes from each other, and the plurality of birefringent regions including the first and second regions cause the light to have different polarization states.

7 Claims, 23 Drawing Sheets

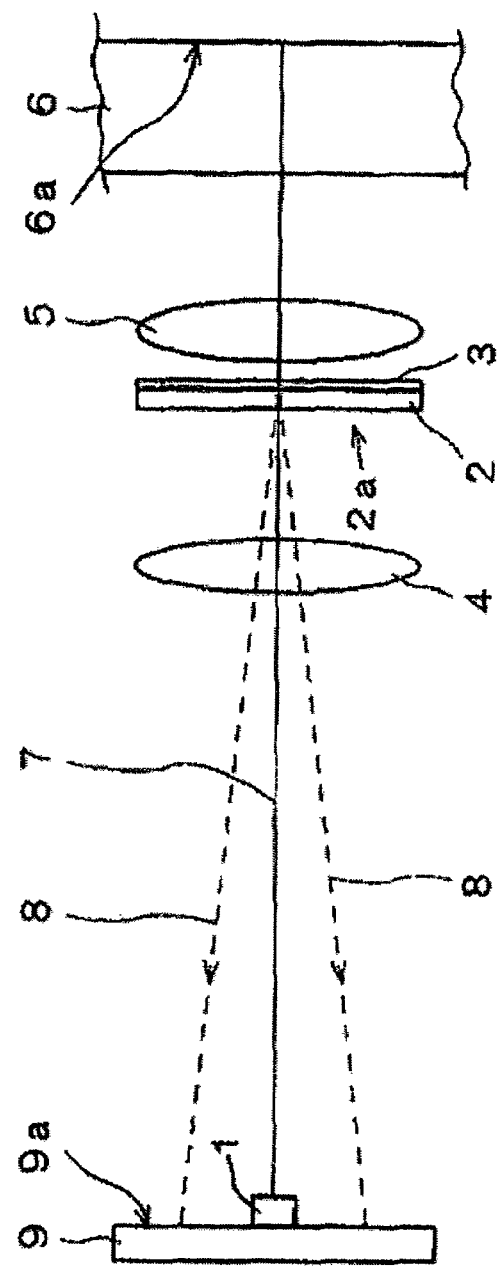
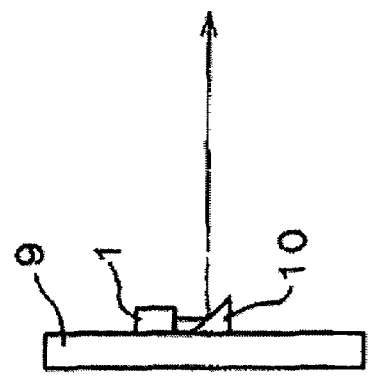
FIG. 1A
FIG. 1B

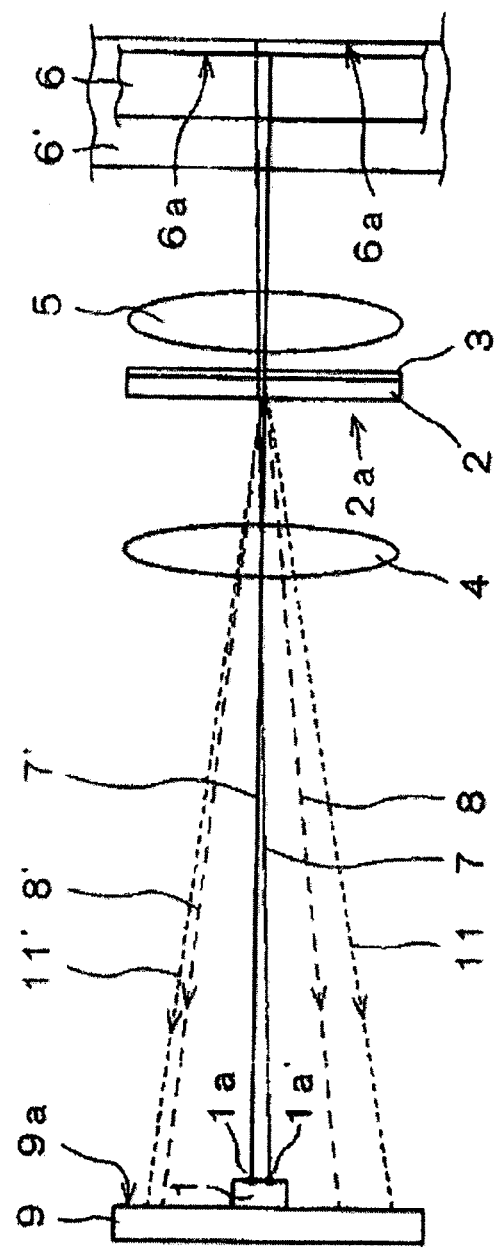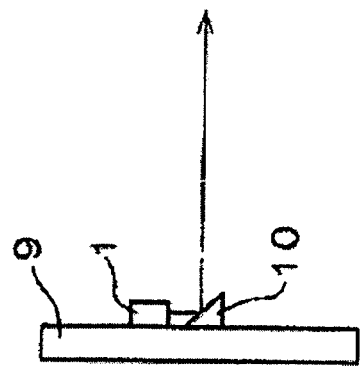
FIG. 5A
FIG. 5B

OPTICAL DISK APPARATUS WITH A WAVELENGTH PLATE HAVING A TWO-DIMENSIONAL ARRAY OF BIREFRINGENT REGIONS

BACKGROUND OF THE INVENTION

1. Field of the Invention

The present invention relates to an optical disk apparatus which is capable of writing data to an optical disk and/or reading data from an optical disk. The present invention also relates to an optical element which is suitable for use in such an optical disk apparatus, and a method for producing the same.

2. Description of the Related Art

An optical disk apparatus comprises a motor for rotating an optical disk, an optical pickup which irradiates the optical disk with a light beam, a signal processing section for processing recording or reproduced data, and like elements. Among others, the optical pickup, which is a most vital component to enhanced storage density, comprises a light source for generating a light beam, lenses for converging the light beam onto the recording surface of the optical disk, and a photodetector for detecting light which has been reflected from the optical disk (reproduction light or signal light) and converting the detected light into an electrical signal.

A known optical disk apparatus is disclosed in, for example, Japanese laid-open patent publication No. 2000-132848.

Hereinafter, referring to FIGS. 19A and 19B, the structure of the conventional optical pickup disclosed in Japanese Laid-Open Patent Publication No. 2000-132848 will be described.

FIG. 19A shows an optical pickup structure in a conventional optical disk apparatus. FIG. 19B shows the neighborhood of a light source 1 thereof.

As shown in FIG. 19A, this optical pickup comprises a photodetection substrate 9 on which the light source 1 (e.g., a semiconductor laser) is mounted, as well as an optical system. The optical system includes a collimating lens 4, a polarization hologram substrate 2, a ¼ wavelength plate 3, and an objective lens 5, which are provided along an optical axis 7. The ¼ wavelength plate 3, which is formed on the same substrate as a hologram surface 2a of the polarization hologram substrate 2, moves integrally with the objective lens 6.

The surface of the photodetection substrate 9 includes a region (detection surface 9a) in which a plurality of photosensitive portions such as photodiodes are formed, and a region in which the light source 1 is mounted. As shown in FIG. 19B, a reflection mirror 10 is formed on the surface of the photodetector substrate 9, the reflection mirror 10 reflecting light emitted from the light source 1 in a direction which is substantially perpendicular to the surface of the photodetection substrate 9.

Laser light which has been emitted from the light source 1 is reflected from the reflection mirror 10 on the photodetection substrate 9, and thereafter collimated into parallel light by the collimating lens 4. The parallel light is transmitted through the polarization hologram substrate 2 in the form of P-polarized light. The polarization hologram substrate 2 is characterized so that it does not diffract P-polarized light, but diffracts S-polarized light. In the case where the incident light is S-polarized light, the polarization hologram substrate 2 has a diffraction efficiency of about 0% for the $0^{th}$ order light, and about 41% for the $\pm 1^{st}$ order light, for example.

The light transmitted through the polarization hologram substrate 2 is converted by a ¼ wavelength plate 3' from linearly polarized light (P-polarized light) into circularly polarized light. The circularly polarized light is converged by the objective lens 5 onto a signal surface 6a of the optical disk substrate 6. The ¼ wavelength plate 3', which is constructed on the same substrate as the hologram surface 2a, moves integrally with the objective lens 6.

The light (signal light) which has been reflected from the signal surface 6a of the optical disk substrate 6 propagates in the opposite direction of the forward path. This light (signal light) travels through the objective lens 5 and enters the ¼ wavelength plate 3'. The light transmitted through the ¼ wavelength plate 3' is converted from circularly polarized light into linearly polarized light (S-polarized light). The S-polarized light enters the hologram surface 2a of the polarization hologram substrate 2 so as to be diffracted. Through this diffraction, $1^{st}$ order diffracted light 8 and $-1^{st}$ order diffracted light 8' are formed with respect to the optical axis 7 as an axis of symmetry. The diffracted light 8 and 8' is each converged on the detection surface 9a on the detector 9 via the collimating lens 4. The detection surface 9a is located substantially at the focal plane of the collimating lens 4 (i.e., an imaginary emission point on the light source 1).

Generally-used optical disk systems are designed on the premise that the optical disk substrate 6 does not have any birefringence. In reality, however, there are some low-quality optical disk substrates 6 which do suffer from a large birefringence, thus inviting the following problems.

Assuming that the laser light which is emitted from the light source 1 has a wavelength of $\lambda$, the birefringence of the optical disk substrate 6 may cause a birefringent phase difference (retardation: phase delay) exceeding $\lambda/2$, over the course of the back and forth trips of light. When converted into an angle, $\lambda/2$ equals 180°. Hereinafter, any birefringent phase difference will be expressed in terms of angle.

Assuming that the birefringent phase difference ascribable to the optical disk substrate 6 is 180° over the course of the back and forth trips of light, and when taken together with the birefringent phase difference (180°) of the ¼ wavelength plate 3' over the course of the back and forth trips of light, there is a birefringent phase difference of 360°. As a result, the signal light entering the polarization hologram substrate 2 is P-polarized, instead of being S-polarized. Since the polarization hologram substrate 2 is characterized so as not to diffract P-polarized light, the light in the return path, which is P-polarized, is not diffracted. This means that the light amounts of the diffracted light 8 and 8' shown in FIG. 19 are zero. Therefore, the photodetector 9 cannot receive the signal light reflected from the signal surface 6a. Thus, not only is it impossible to read the signal, but it is also impossible to perform focusing and tracking controls, etc.

SUMMARY OF THE INVENTION

In order to overcome the problems described above, preferred embodiments of the present invention provide an optical disk apparatus which detects a light amount greater than zero even when used in conjunction with an optical disk substrate having a large birefringence, so that it is possible to properly read a signal without errors and properly perform optical disk controls.

An optical disk apparatus according to the present invention comprises: a light source for emitting light; an objective lens for converging the light onto a signal surface of an optical disk; a polarized beam diffraction element for diffracting the light reflected from the optical disk; a photodetector for detecting the light diffracted from the polarized beam diffraction element; and a wavelength plate disposed between the optical disk and the polarized beam diffraction element, wherein, the wavelength plate has a two-dimensional array of a plurality of birefringent regions including first and second regions, the first and second regions differing in birefringent phase difference and/or optic axes from each other, and the plurality of birefringent regions including the first and second regions cause the light to have different polarization states.

In a preferred embodiment, optic axes of the first and second regions of the wavelength plate are oriented in different directions from each other.

In a preferred embodiment, the first region has a birefringent phase difference of $\lambda/4+\alpha$ and the second region has a birefringent phase difference of $\lambda/4-\alpha$, where $\lambda$ is a wavelength of the light emitted from the light source.

In a preferred embodiment, the first region has a birefringent phase difference of $\lambda/4+\alpha$ and the second region has a birefringent phase difference of $-3\lambda/4-\alpha$, where $\lambda$ is a wavelength of the light emitted from the light source.

In a preferred embodiment, $\alpha$ is in a range of $-\lambda/8<\alpha<\lambda/8$.

In a preferred embodiment, a plurality of said first regions and a plurality of said second regions alternate on the wavelength plate, each first region and each second region having a strip shape.

In a preferred embodiment, the light source is capable of emitting first laser light of a wavelength $\lambda 1$ and second laser light of a wavelength $\lambda 2$ (where $\lambda 2>\lambda 1$).

An optical disk apparatus according to the present invention comprises: a light source for emitting light of a wavelength $\lambda 1$ and light of a wavelength $\lambda 2$ (where $\lambda 1 \neq \lambda 2$); an objective lens for converging the light onto a signal surface of an optical disk; a polarized beam diffraction element for diffracting the light reflected from the optical disk; a photodetector for detecting the light diffracted from the polarized beam diffraction element; and a wavelength plate disposed between the optical disk and the polarized beam diffraction element, wherein, an imaginary line L on the beam splitter is defined, the line L being perpendicular to a radial direction of the optical disk, and intersecting an optical axis of the objective lens; the beam splitter at least has a region a1, a region a2, a region a3, a region A1, a region A2, and a region A3, such that the region a1, the region a2, and the region a3 are on a same side of the line L on the beam splitter, and the region A1, the region A2, and the region A3 are substantially symmetrical regions to the region a1, the region a2, and the region a3, respectively, with respect to the line L; the photodetector at least has two regions b and B; light of the wavelength $\lambda 1$ entering the region a3, the region a1, and the region A2 of the beam splitter produces $1^{st}$ order diffracted light which is projected onto the region b of the photodetector, and light of the wavelength $\lambda 1$ entering the region A3, the region A1, and the region a2 of the beam splitter produces $1^{st}$ order diffracted light which is projected onto the region B of the photodetector; light of the wavelength $\lambda 2$ entering the region a3 of the beam splitter produces $1^{st}$ order diffracted light which is projected onto the region B of the photodetector, and light of the wavelength $\lambda 2$ entering the region A3 of the beam splitter produces $1^{st}$ order diffracted light which is projected onto the region b of the photodetector; and based on a difference between a detection signal from the region b and a detection signal from the region B, the optical disk apparatus generates a tracking error signal for the optical disk or a correction signal for correcting the tracking error signal.

In a preferred embodiment, the photodetector further has at least two regions b' and B'; light from a first light source or a second light source entering the region a3, the region a1, and the region a2 of the beam splitter produces $-1^{st}$ order diffracted light which is projected onto the region b' of the photodetector, and light from the first light source or the second light source entering the region A3, the region A1, and the region A2 of the beam splitter produces $-1^{st}$ order diffracted light which is projected onto the region B' of the photodetector; and the optical disk apparatus generates a difference signal based on a difference between a detection signal from the region b' and a detection signal from the region B', and generates a tracking error signal for the optical disk by adding to the difference signal a value obtained by multiplying the correction signal by an arbitrary coefficient.

Alternatively, an optical disk apparatus according to the present invention comprises: a light source for emitting light of a wavelength $\lambda 1$ and light of a wavelength $\lambda 2$ (where $\lambda 1 \neq \lambda 2$); an objective lens for converging the light onto a signal surface of an optical disk; a polarized beam diffraction element for diffracting the light reflected from the optical disk; a photodetector for detecting the light diffracted from the polarized beam diffraction element; and a wavelength plate disposed between the optical disk and the polarized beam diffraction element, wherein, an imaginary line L on the beam splitter is defined, the line L being perpendicular to a radial direction of the optical disk, and intersecting an optical axis of the objective lens; the beam splitter at least has eight regions a1, a2, a3, A1, A2, A3, and A4 such that the region a1, the region a2, the region a3, and the region a4 are on a same side of the line L on the beam splitter, and the region A1, the region A2, the region A3, and the region A4 are substantially symmetrical regions to the region a1, the region a2, the region a3, and the region a4, respectively, with respect to the line L; the photodetector at least has six regions b, B, b', B', b", and B"; light of the wavelength $\lambda 1$ entering the region A2 and the region a1 of the beam splitter produces $-1^{st}$ order diffracted light which is projected onto the region b of the photodetector, and light of the wavelength $\lambda 1$ entering the region a2 and the region A1 of the beam splitter produces $-1^{st}$ order diffracted light which is projected onto the region B of the photodetector, the optical disk apparatus generating a tracking error signal for the optical disk based on a difference between a detection signal from the region b and a detection signal from the region B; light of the wavelength $\lambda 2$ entering the region a3 and the region a4 of the beam splitter produces $-1^{st}$ order diffracted light which is projected onto the region b' of the photodetector, and light of the wavelength $\lambda 2$ entering the region A3 and the region A4 of the beam splitter produces $-1^{st}$ order diffracted light which is projected onto the region B' of the photodetector, the optical disk apparatus generating a difference signal based on a difference between a detection signal from the region b' and a detection signal from the region B'; and light of the wavelength $\lambda 2$ entering the region a3 further produces $1^{st}$ st order diffracted light which is projected onto the region b" of the photodetector, and light of the wavelength $\lambda 2$ entering the region A3 further produces $1^{st}$ order diffracted light which is projected onto the region B" of the photodetector, the optical disk apparatus generating a correction signal based on a difference between a detection signal from the region b" and a detection signal from the region B"; the optical disk apparatus generates a tracking error signal for the optical disk by adding to the difference signal a value obtained by multiplying the correction signal by an arbitrary coefficient.

An optical element according to the present invention comprises a two-dimensional array of a plurality of birefringent regions including first and second regions, the first and second regions differing in birefringent phase difference and/or optic axes from each other, wherein the plurality of birefringent regions including the first and second regions cause the light to have different polarization states.

In a preferred embodiment, optic axes of the first and second regions are parallel to each other, and the first and second regions have different retardations from each other.

In a preferred embodiment, optic axes of the first and second regions are oriented in different directions from each other.

In a preferred embodiment, a plurality of said first regions and a plurality of said second regions alternate within a plane perpendicular to an optical axis.

In a preferred embodiment, each of the first and second regions has a shape selected from the group consisting of: a strip shape, a checker shape, and an annular shape.

In a preferred embodiment, the optical element further comprises a polarization filter.

In a preferred embodiment, the polarization filter is a polarization hologram.

In a preferred embodiment, the optic axis of the first region is at $45°+\delta\pm\alpha (-10°<\delta<10°, 0°<\alpha\leq15°)$ with respect to a polarization direction of incident light; and the optic axis of the second region is at $45°+\delta-\alpha$ with respect to a polarization direction of incident light.

In a preferred embodiment, with respect to light of at least one wavelength among light of a plurality of wavelengths traveling back and forth through the optical element, an average retardation $\Delta$ of the plurality of birefringent regions is set equal to $(2m+1)\pi/2$ (where m is an integer).

In a preferred embodiment, the optical element is a broadband wavelength plate having a same retardation $\Delta$ for light of different wavelengths.

In a preferred embodiment, optic axes of some of the plurality of birefringent regions are at 45° with respect to a polarization direction of incident light.

An optical pickup according to the present invention comprises: a light source for emitting two or more kinds of laser light of different wavelengths; a lens for converging the light emitted from the light source onto an optical information medium; and a photodetector for receiving light reflected from the optical information medium, wherein the optical pickup further comprises the optical element according to the present invention, the optical element being disposed in a region common to an optical path from the light source to the optical information medium and an optical path from the optical information medium to the photodetector.

In a preferred embodiment, the light source and the photodetector are integrally formed.

A method according to the present invention for producing an optical element having a two-dimensional array of a plurality of birefringent regions including first and second regions, the first and second regions differing in birefringent phase difference and/or optic axes from each other, the plurality of birefringent regions including the first and second regions causing the light to have different polarization states, comprises the steps of: (a) forming on a substrate an alignment film including a plurality of regions having different alignment directions from one another; and (b) forming a liquid crystal layer on the alignment film and controlling the alignment direction of each region of the liquid crystal layer.

In a preferred embodiment, the step (a) comprises the substeps of: (a1) depositing a photo-alignable film on the substrate; (a2) subjecting a portion of the photo-alignable film to an exposure with ultraviolet light to form a first aligning region having a first alignment direction; and (a3) subjecting another portion of the alignment film to an exposure with ultraviolet light to form a second aligning region having a second alignment direction, the second alignment direction being different from the first alignment direction.

In a preferred embodiment, the step (b) comprises the substeps of: (b1) forming on the alignment film a liquid crystal layer containing a UV-curing material, and controlling the alignment directions within the liquid crystal layer in accordance with first and second alignment directions; and (b2) curing the liquid crystal layer by irradiating the liquid crystal layer with ultraviolet light.

According to the present invention, regardless of the exact birefringence of the optical disk substrate, the birefringent phase difference of returned light has a distribution (fluctuations). Therefore, a more than zero detected light amount is obtained, so that signal reading errors or control failure can be prevented. In the case of adopting a structure where two light sources are comprised, it is possible to provide countermeasures against birefringence in accordance with each light source, so that control signals and a reproduction signal for various kinds of optical disks can be detected with the same photodetector.

Furthermore, there is provided an optical disk apparatus which enables tracking control free of off-tracking through calculations of detection signals even in the following cases: (1) where the objective lens or the polarized beam diffraction element has an eccentricity along a radial direction of the optical disk; (2) where the optical disk substrate is tilted; and (3) where a light spot rests on a border between a recorded region and an unrecorded region on the optical disk and is susceptible to the influence from an adjoining track.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 1A is an essential structural diagram showing an optical disk apparatus according to one embodiment of the present invention.

FIG. 1B is a side view of a light source section thereof.

FIG. 5A is an essential structural diagram showing an optical disk apparatus according to another embodiment of the present invention. FIG. 5B is a side view showing a light source section thereof.

DETAILED DESCRIPTION OF PREFERRED EMBODIMENTS

Figure 2A:
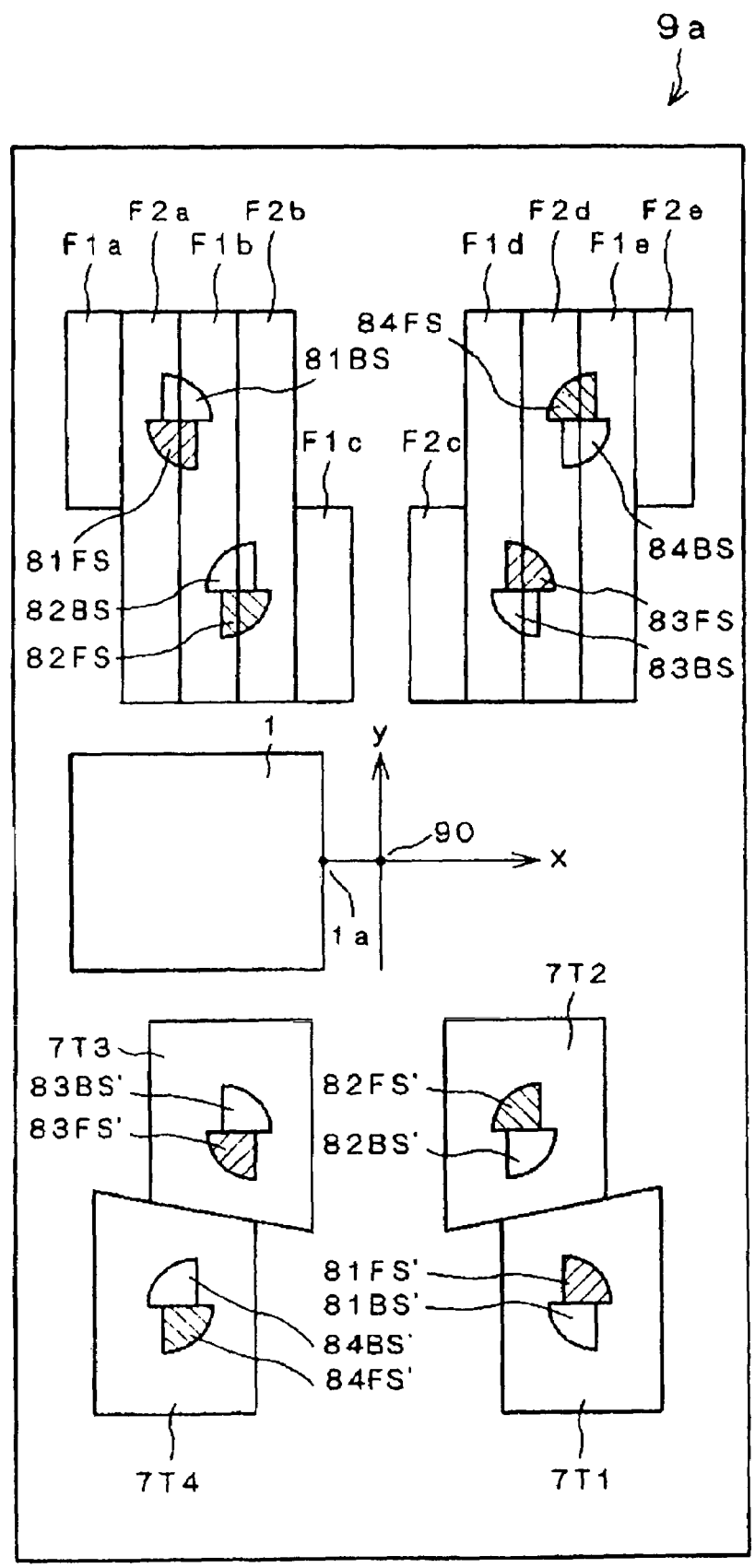
FIG. 2A is a structural diagram showing a detection surface according to the above embodiment.

Hereinafter, preferred embodiments of the present invention will be described with reference to the accompanying drawings.

Embodiment 1

With reference to FIGS. 1A and 1B to FIGS. 4A-4C, an optical disk apparatus according to a first embodiment of the present invention will be described.

First, FIG. 1A will be referred to. FIG. 1A shows essential components of an optical pickup for an optical disk apparatus according to the present embodiment. FIG. 1B is a side view showing a light source section 1 and a neighborhood thereof.

As shown in FIG. 1A, the optical pickup according to the present embodiment comprises a photodetection substrate 9 on which the light source 1 (e.g., a semiconductor laser) is mounted, as well as an optical system. The optical system includes a collimating lens 4, a polarization hologram substrate 2, a distributed-type wavelength plate 3, and an objective lens 5, which are provided along an optical axis 7. The distributed-type wavelength plate 3, which is formed on the same substrate as a hologram surface 2a of the polarization hologram substrate 2, moves integrally with the objective lens 6. A most characteristic feature of the present embodiment is the distribution wavelength plate 3. As used herein, a "distribution wavelength plate" is defined as a wavelength plate having birefringent regions of different characteristics arranged along the plane of a principal face thereof.

The surface of the photodetection substrate 9 includes a region (detection surface 9a) in which a plurality of photosensitive portions such as photodiodes are formed, and a region in which the light source 1 is mounted. As shown in FIG. 1B, a reflection mirror 10 is formed on the surface of the photodetector substrate 9, the reflection mirror 10 reflecting light emitted from the light source 1 in a direction which is substantially perpendicular to the surface of the photodetection substrate 9.

Laser light which has been emitted from the light source 1 is reflected from the reflection mirror 10 on the photodetection substrate 9, and thereafter collimated into parallel light by the collimating lens 4. The parallel light is transmitted through the polarization hologram substrate 2 in the form of P-polarized light. The polarization hologram substrate 2 is characterized so that it does not diffract P-polarized light, but diffracts S-polarized light. In the case where the incident light is S-polarized light, the polarization hologram substrate 2 has a diffraction efficiency of about 0% for the $0^{th}$ order light, and about 41% for the $\pm 1^{st}$ order light, for example.

The light which has been transmitted through the polarization hologram substrate 2 is converted by the distributed-type wavelength plate 3 into light comprising a spatial mixture of two types of polarization states (which hereinafter may be referred to as "mixed-polarized light"). The detailed structure and functions of the distributed-type wavelength plate 3 will be described later. The mixed-polarized light is converged by the objective lens 5 onto a signal surface 6a of the optical disk substrate 6.

The light (signal light) which has been reflected from the signal surface 6a of the optical disk substrate 6 propagates in the opposite direction of the forward path. This light (signal light) travels through the objective lens 5 and enters the distributed-type wavelength plate 3. The light transmitted through the distributed-type wavelength plate 3 enters the hologram surface 2a of the polarization hologram substrate 2 so as to be diffracted. Through this diffraction, $1^{st}$ order diffracted light 8 and $-1^{st}$ order diffracted light 8' are formed with respect to the optical axis 7 as an axis of symmetry. The diffracted light 8 and 8' is each converged on the detection surface 9a on the detector 9 via the collimating lens 4. The detection surface 9a is located substantially at the focal plane of the collimating lens 4 (i.e., an imaginary emission point on the light source 1).

Figure 2B:
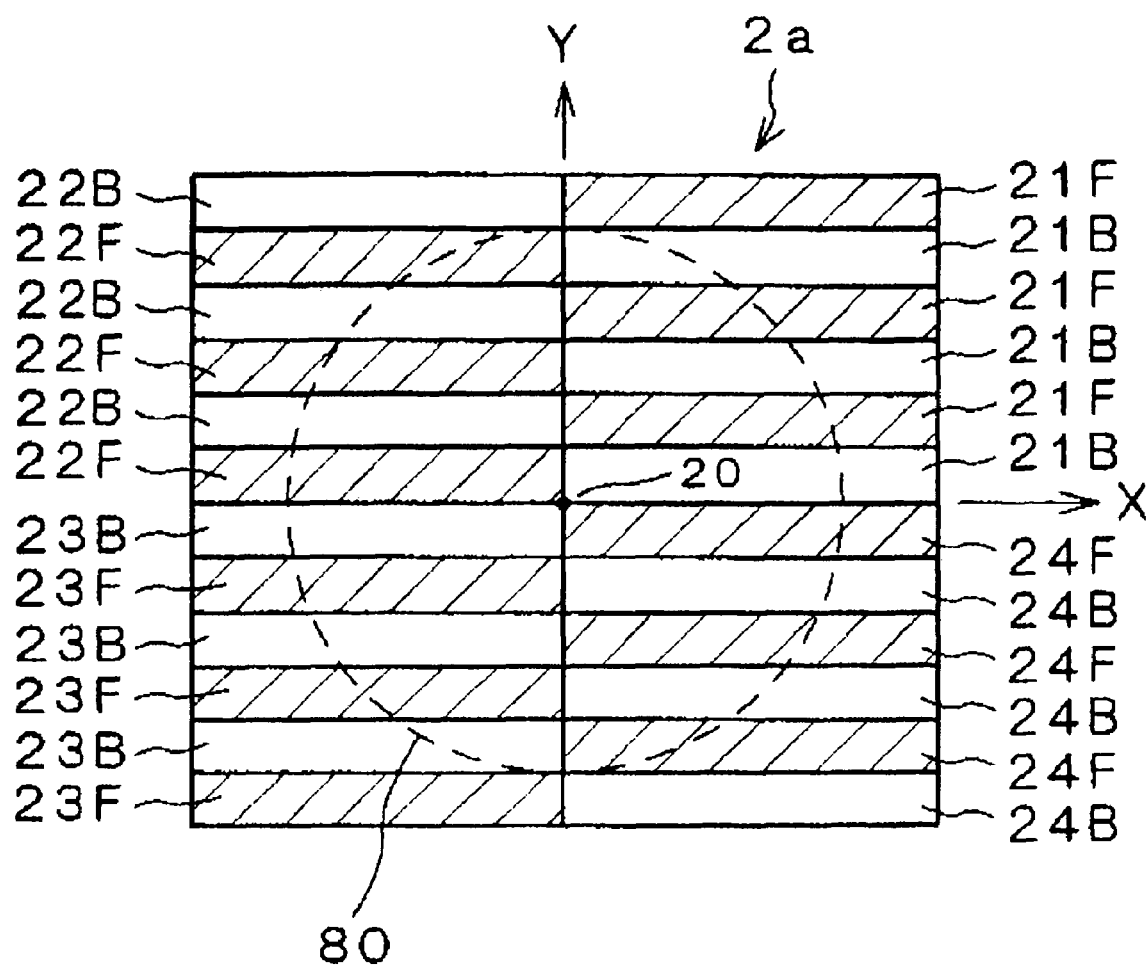
FIG. 2B is a structural diagram showing a hologram surface according to the above embodiment.

FIG. 2A shows the structure of the photodetection surface 9a of the photodetector 9. FIG. 2B shows the structure of the hologram surface 2a of the polarization hologram substrate 2. Both FIGS. 2A and 2B are plan views showing the photodetection surface 9a and the hologram surface 2a, respectively, as viewed from the side of the optical disk 6.

Referring to FIG. 2B, the structure of the hologram surface 2a will be described. The hologram surface 2a is divided into four portions (quadrants) by two lines (X and Y axes) which perpendicularly intersect each other at an intersection 20 between the hologram surface 2a and the optical axis 7. The Y axis corresponds to a radial direction on the signal surface 6a of the optical disk substrate 6. Each quadrant is divided along the Y axis into strip regions 21B and 21F; 22B and 22F; 23B and 23F; or 24B and 24F. Each strip region extends along the X axis.

Next, by referring to FIG. 2A, the structure of the detection surface 9a will be described. When an intersection between the detection surface 9a and the optical axis 7 is defined as an "intersection 90", x and y axes of a coordinate system whose origin is at the intersection 90 are parallel to, respectively, the X axis and the Y axis shown in FIG. 2B. The light source 1 is mounted at a point on the x axis, and emits laser light from an emission point 1a thereof.

As shown in FIG. 2A, in a region corresponding to the "+" side of the y axis on the detection surface 9a, strip-like focus detection cells F1a, F2a, F1b, F2b, F1c, F2c, F1d, F2d, F1e, and F2e are formed, each of which extends along the y axis. In a region corresponding to the "−" side of the y axis, trapezoidal tracking detection cells 7T1, 7T2, 7T3, and 7T4 are formed. These detection cells are placed in a symmetrical arrangement with respect to the y axis. Note that light which is emitted from the emission point 1a of the light source 1 travels along a direction parallel to the x axis, within a plane which contains the x axis and is perpendicular to the plane of FIG. 2A, so as to be reflected by the reflection mirror 10 in the optical axis direction (i.e., a direction which extends through the point 90 and perpendicularly to the plane of FIG. 2A).

FIG. 2B shows (with a circular broken line 80) the outer shape of a beam cross section of light entering the hologram surface 2a. Out of the light entering the hologram surface 2a, $1^{st}$ order diffracted light which has been diffracted at the strip regions 21B and 21F located in the first quadrant of the hologram surface 2a is respectively converged at light spots 81BS and 81FS, each of which lies astride the border between the detection cells F2a and F1b. The $-1^{st}$ order diffracted light is converged at light spots 81BS' and 81FS', which fit within the detection cell 7T1.

The $1^{st}$ order diffracted light which has been diffracted at the regions 22B and 22F located within the second quadrant is respectively converged at light spots 82BS and 82FS, each of which lies astride the border between the detection cells F1b and F2b. The $-1^{st}$ order diffracted light is converged at light spots 82BS' and 82FS', which fit within the detection cell 7T2.

The $1^{st}$ order diffracted light which has been diffracted at the regions 23B and 23F located within the third quadrant is respectively converged at light spots 83BS and 83FS, each of which lies astride the border between the detection cells F1d and F2d. The $-1^{st}$ order diffracted light is converged at light spots 83BS' and 83FS', which fit within the detection cell 7T3.

The $1^{st}$ order diffracted light which has been diffracted at the regions 24B and 24F located within the fourth quadrant is respectively converged at light spots 84BS and 84FS, each of which lies astride the border between the detection cells F2d and F1e. The $-1^{st}$ order diffracted light is converged at light spots 84BS' and 84FS', which fit within the detection cell 7T4.

Some of the detection cells are electrically interconnected so that the following six types of signals F1, F2, T1, T2, T3, and T4 are output from the photodetector 9:

F1=signal obtained from the detection cell F1a
+ signal obtained from the detection cell F1b
+ signal obtained from the detection cell F1c
+ signal obtained from the detection cell F1d
+ signal obtained from the detection cell F1e F2=signal obtained from the detection cell F2a
+ signal obtained from the detection cell F2b
+ signal obtained from the detection cell F2c
+ signal obtained from the detection cell F2d
+ signal obtained from the detection cell F2e T1=signal obtained from the detection cell 7T1
T2=signal obtained from the detection cell 7T2
T3=signal obtained from the detection cell 7T3
T4=signal obtained from the detection cell 7T4

It is assumed that the y axis and the Y axis shown in FIGS. 2A and 2B, respectively, are parallel to a radial direction on the signal surface 6a of the optical disk substrate 6. In this case, a focus error signal FE from the signal surface 6a, a tracking error signal TE, and a reproduction signal RF are to be detected based on eq. 1 to eq. 3 below:

$$FE=F1-F2 \quad \text{(eq. 1)}$$

$$TE=T1+T2-T3-T4 \quad \text{(eq. 2)}$$

$$RF=F1+F2+T1+T2+T3+T4 \quad \text{(eq. 3)}$$

Figure 3A:
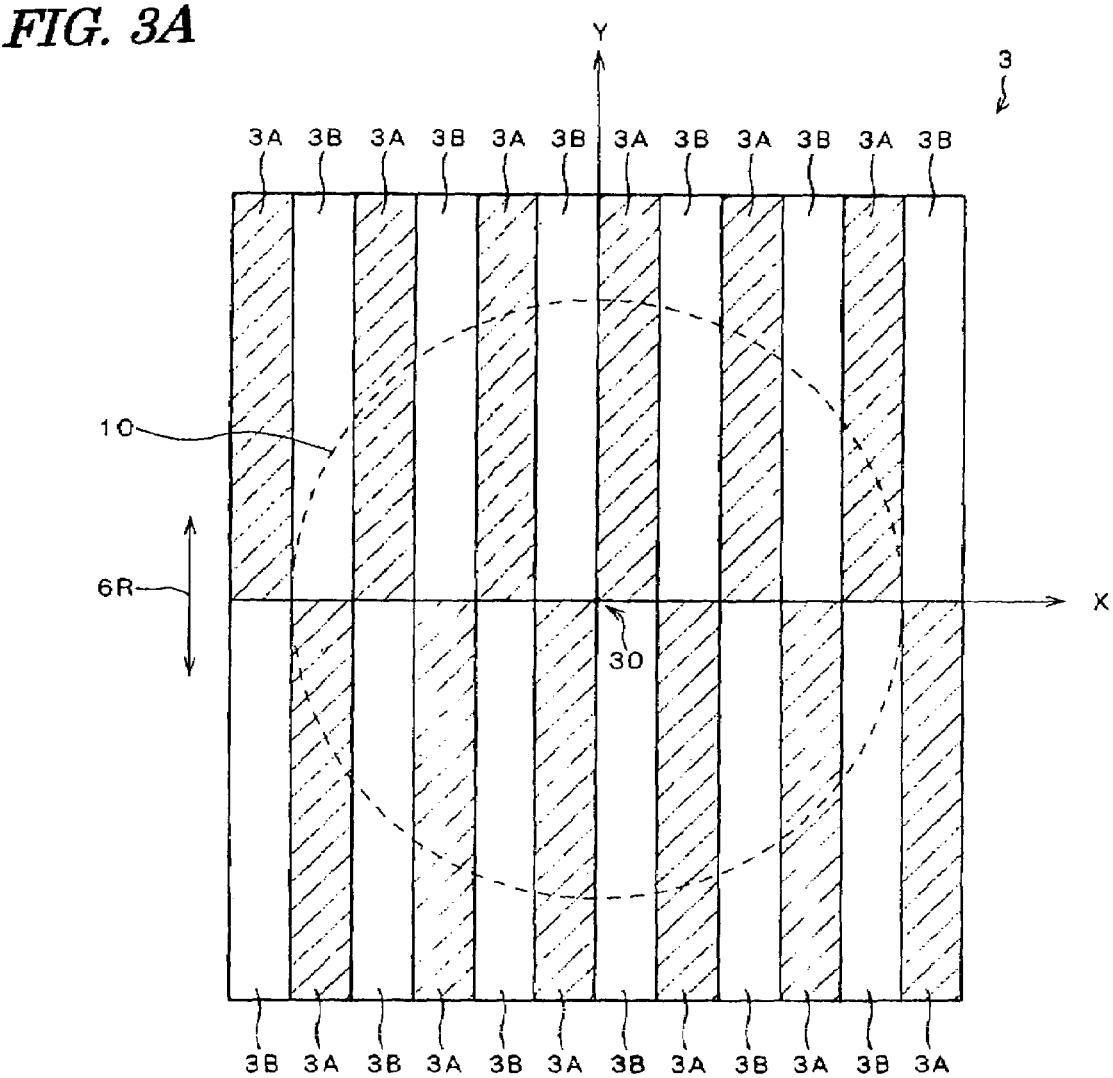
FIGS. 3A and 3B are a plan view and a cross-sectional view, respectively, showing a distributed-type wavelength plate according to the above embodiment.
Figure 3B:
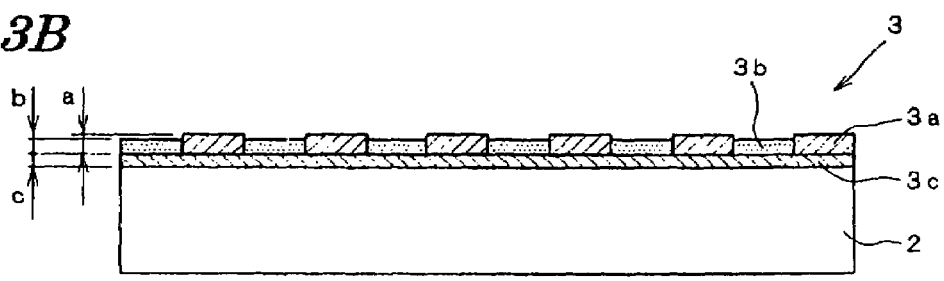

Next, with reference to FIGS. 3A and 3B, the structure of the distributed-type wavelength plate 3 will be described. FIGS. 3A and 3B are a plan view and a cross-sectional view, respectively, showing the distributed-type wavelength plate 3. Note that FIG. 3A is a plan view as viewed from the side of the optical disk substrate 6. Herein, two lines perpendicularly intersecting each other at an intersection 30 between the surface of the distributed-type wavelength plate 3 and the optical axis 7 are defined as X and Y axes. The X and Y axes here correspond to the X and Y axes on the hologram surface 2a. The Y axis here is parallel to the radial direction 6R (hereinafter referred to as the "disk radial direction") on the signal surface 6a of the optical disk substrate 6.

The distributed-type wavelength plate 3 is divided into a plurality of strip regions 3A and 3B, each of which has a longitudinal axis along the disk radial direction 6R. Each strip region 3A is responsible for a birefringent phase difference of $90+\alpha°$, whereas each strip region 3B is responsible for a birefringent phase difference of $90-\alpha°$. The fast axis is oriented in a 45° direction with respect to the optical disk radial direction 6R. The strip regions 3A and the strip regions 3B alternate with each other.

As shown in FIG. 3B, the distributed-type wavelength plate 3 has a birefringent layer 3c (having a thickness of c) formed on the polarization hologram substrate 2, as well as birefringent layers 3a and transparent layers 3b which are arranged on the birefringent layer 3c. The transparent layers 3a form the strip regions 3A, whereas the transparent layers 3b form the strip regions 3B. Each birefringent layer 3a and each transparent layer 3b have thicknesses of a and b, respectively. Although FIG. 3B illustrates a case where b<a, it might also be possible that b=a or b>a. Each transparent layer 3b can be regarded as a phase correcting layer functioning to ensure phase alignment between the light transmitted through the transparent layers 3b and the light transmitted through the transparent layers 3a.

The distributed-type wavelength plate 3 as above can be produced in the following manner, for example.

First, the birefringent layer 3c is deposited so as to have a uniform thickness on the polarization hologram substrate 2. After depositing the birefringent layer 3a on the birefringent layer 3, the birefringent layer 3a is patterned by photolithography and etching techniques. Through this patterning, those portions of the birefringent layer 3a in which the strip regions 3B shown in FIG. 3A are to be formed are removed, thus leaving a plurality of openings. Next, each opening is filled with a transparent layer 3b, whereby the structure as shown in FIG. 3B is obtained.

In the present embodiment, the birefringent layer 3c is responsible for a birefringent phase difference of $90-\alpha°$, whereas each birefringent layer 3a is responsible for a birefringent phase difference of $2\alpha°$. Both fast axes are tilted at 45° with respect to the optical disk radial direction 6R. The distributed-type wavelength plate 3 may further comprise another transparent layer covering the birefringent layers 3a and the transparent layers 3b; and the further transparent layer may be a transparent substrate. Moreover, the birefringent layers 3a may be located below the birefringent layer 3c instead.

The region marked by the circular broken line 10 in FIG. 3A schematically shows a cross section of a light beam entering the distributed-type wavelength plate 3. In response to P-polarized light entering the distributed-type wavelength plate 3, light (mixed-polarized light) comprising a spatial mixture of two types of polarization states (both being elliptical polarization close to circular polarization) goes out from the distributed-type wavelength plate 3.

As shown in FIG. 1, the mixed-polarized light transmitted through the distributed-type wavelength plate 3 is converged by the objective lens 5 onto the signal surface 6a of the optical disk substrate 6. Although the diameter of the focused beam spot formed on the signal surface 6a might be slightly increased from the conventional value, the increase would be small. For example, assuming that $\alpha=20°$, NA=0.5, and $\lambda=790$ nm, the increase in the spot diameter will be about $\frac{1}{1000}$ μm, which would correspond to a 2% to 3% deterioration of Strehl (which refers to normalized peak intensity).

Next, referring to FIGS. 4A to 4C, the functions of the distributed-type wavelength plate 3 will be described.

Figure 4A:
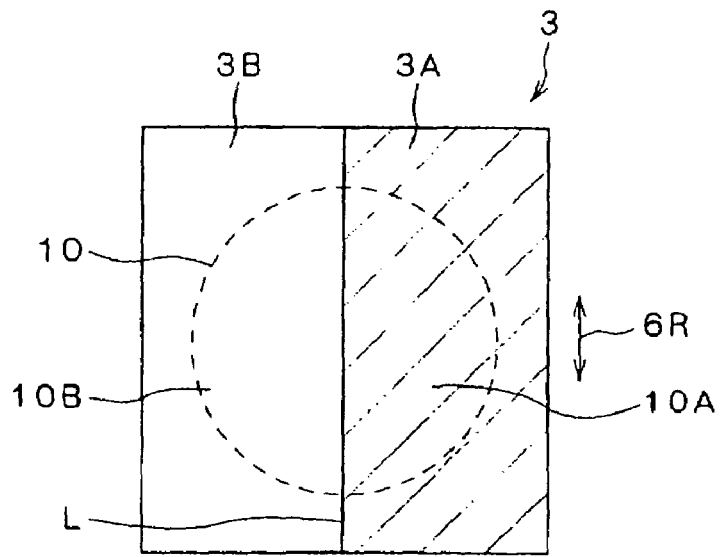
FIG. 4A is a diagram illustrating a birefringence-counteracting principle applicable to the forward path, as realized by a distributed-type wavelength plate according to the above embodiment.
Figure 4B:
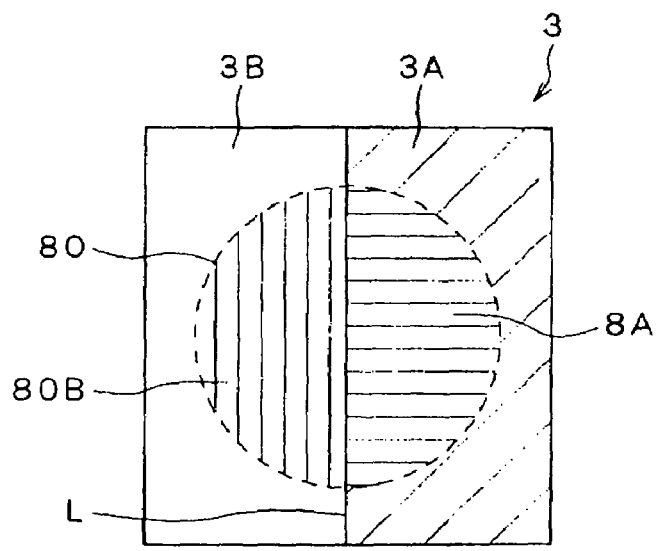
FIG. 4B shows one birefringence-counteracting principle applicable to the return path.
Figure 4C:
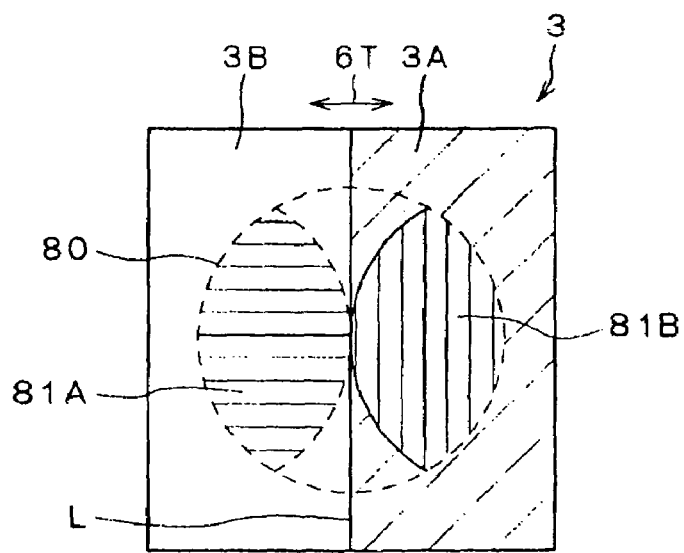
FIG. 4C shows another birefringence-counteracting principle applicable to the return path.

For simplicity, FIGS. 4A to 4C illustrate an example in which the distributed-type wavelength plate 3 is divided into two strip regions 3A and 3B. Specifically, the distributed-type wavelength plate 3 is equally divided into two regions 3A and 3B by a line L which extends along the optical disk radial direction 6R. The region 3A is responsible for a birefringent phase difference of $90+\alpha°$, whereas the region 3B is responsible for a birefringent phase difference of $90-\alpha°$. The fast axes of the regions 3A and 3B are both oriented in a 45° direction with respect to the optical disk radial direction 6R.

FIG. 4A shows a relationship between incident light 10 and the distributed-type wavelength plate 3 in the forward path.

Out of incident light 10 which is transmitted through the distributed-type wavelength plate 3, light 10A transmitted through the right region of the line L has a birefringent phase difference of $90+\alpha°$. On the other hand, light 10B transmitted through the left region of the line L has a birefringent phase difference of $90-\alpha°$.

FIG. 4B shows a relationship between incident light 80 and the distributed-type wavelength plate 3 in the return path.

Since the incident light 80 is reflected light from the signal surface 6a of the optical disk substrate 6, its light distribution is inverted. In other words, out of the incident light 80 entering the distributed-type wavelength plate 3, light 80A transmitted through the right region of the line L has a birefringent phase difference of $90-\alpha°$. On the other hand, light 80B transmitted through the left region of the line L has a birefringent phase difference of $90+\alpha°$. Note that it is herein assumed that the optical disk substrate 6 does not cause any change in the birefringent phase difference.

FIG. 4C shows a relationship between the incident light 80 and the distributed-type wavelength plate 3 in the return path, in the case where a signal pit pattern exists on the signal surface 6a of the optical disk substrate 6. It is assumed here that pits having a sufficiently broad width along the optical disk radial direction 6R are arranged along a disk rotation direction 6T at an equal pitch.

Due to such a pit pattern, the reflected light from the signal surface 6a is diffracted along the disk rotation direction 6T, so that $1^{st}$ order diffracted light 81A and $-1^{st}$ order diffracted light 81B are produced. The birefringent phase differences of these rays of diffracted light correspond to those of the incident light 80A and 80B in FIG. 4B being swapped from left to right and vice versa. In other words, the $1^{st}$ order diffracted light 81A has a birefringent phase difference of $90-\alpha°$, whereas the $-1^{st}$ order diffracted light 81B has a birefringent phase difference of $90+\alpha°$ at entry into the distributed-type wavelength plate 3.

Therefore, after the $1^{st}$ order diffracted light 81A and the $-1^{st}$ order diffracted light 81B have been transmitted through the distributed-type wavelength plate 3, the diffracted light 81A has a birefringent phase difference of $180-2\alpha°$, whereas the diffracted light 80B has a birefringent phase difference of $180+2\alpha°$. Again, it is assumed herein that the optical disk substrate 6 does not cause any change in the birefringent phase difference.

Next, a case will be considered where the optical disk substrate 6 introduces a birefringent phase difference during transmission of light therethrough.

If the birefringent phase difference ascribable to the optical disk substrate 6 is $-180°$ over the course of the back and forth trips of light, the diffracted light 81A will have a birefringent phase difference of $-2\alpha°$, whereas the light 80B will have a birefringent phase difference of $+2\alpha°$. Regardless of the exact birefringence of the optical disk substrate 6, the birefringent phase differences of the diffracted light 81A and the diffracted light 80B will not be simultaneously zero. Therefore, the returned light (signal light) entering the polarization hologram substrate 2 will always have some polarized component to be diffracted at the hologram surface 2a.

Since pits, embossed portions, signal marks, and the like exist on the signal surface 6a of the optical disk substrate 6, the reflected light from the signal surface 6a will undergo a more complicated diffraction. However, regardless of the exact birefringence of the optical disk substrate 6, the birefringent phase difference of the returned light (signal light) will always have a spatial distribution. Such a distribution can be obtained as long as the distributed-type wavelength plate 3 includes a two-dimensional array of plural birefringent regions including first and second regions which impart different birefringent phase differences to the same incident linearly polarized light. When light is transmitted through such plural birefringent regions, different phase differences occur depending on the incident position of light. The number and shapes of birefringent regions to be formed in the distributed-type wavelength plate 3 can be arbitrary.

With respect to the distributed-type wavelength plate 3 having the strip regions 3A and 3B shown in FIG. 3A, a detected light amount $S_0$ in the case where the birefringent phase difference ascribable to the optical disk substrate 6 is 0° over the course of the back and forth trips of light, and a detected light amount $S_{180}$ in the case where the birefringent phase difference ascribable to the optical disk substrate 6 is 180° over the course of the back and forth trips of light were determined, and the ratio of detected light amounts $S_{180}/S_0$ was calculated.

With respect to a random disk signal from a CD-ROM, the ratio of detected light amounts was 15%, in the case where $\alpha=20°$, NA=0.5, $\lambda=790$ nm. In the case where $\alpha=36°$, the ratio of detected light amounts was 60%. In either case, the calculation showed no substantial deterioration in the optical jitter.

Thus, according to the present embodiment, a more than zero detected light amount is obtained even with respect to an optical disk substrate 6 having a large birefringence, so that signal reading errors or control failure as in the conventional example will not occur.

Although the present embodiment illustrates an example where the distributed-type wavelength plate 3 is divided into strip-like regions, any other manner of division may be adopted as long as two kinds of birefringent phase differences are produced. Similar effects can be obtained also in the case where the division is made so as to produce two or more kinds of birefringent phase differences. The same is also true to each of the following embodiments.

Embodiment 2

Next, with reference to FIGS. 5A and 5B to FIGS. 7A and 7B, an optical disk apparatus according to a second embodiment of the present invention will be described.

In the present embodiment, there are two emission points in the light source 1. Moreover, the pattern of the polarization hologram surface 2a, the detection pattern on the photodetection surface 9a, and the light distribution thereupon are different from those in Embodiment 1. Otherwise, the optical disk apparatus of the present embodiment is identical in construction to the optical disk apparatus of Embodiment 1. Therefore, any descriptions which would be similar to those in Embodiment 1 will be omitted. Those components which have identical counterparts in the optical disk apparatus of Embodiment 1 are denoted by the same reference numerals as those used therein.

The light source 1 may include two different types of semiconductor laser chips, or include a single semiconductor laser chip which is capable of emitting laser light of different wavelengths. Thus, the light source 1 can output laser light of an appropriate wavelength in accordance with the type of optical disk which is mounted on the optical disk apparatus.

As shown in FIG. 5A, laser light (wavelength $\lambda 1$) which has been emitted from a first emission point 1a of the light source 1 mounted on the photodetection substrate 9 is reflected from the reflection mirror 10 on the photodetection substrate 9, and thereafter collimated into parallel light by the collimating lens 4. The parallel light is transmitted through the polarization hologram substrate 2 in the form of P-polarized light. The polarization hologram substrate 2 is characterized so that it does not diffract P-polarized light, but diffracts S-polarized light. In the case where the incident light is S-polarized light, the polarization hologram substrate 2 has a diffraction efficiency of about 0% for the $0^{th}$ order light, and about 41% for the $\pm 1^{st}$ order light, for example. For convenience, FIG. 5A simultaneously illustrates the first optical disk substrate 6 and the second optical disk substrate 6'. In practice, however, either the first optical disk substrate 6 or the second optical disk substrate 6' is to be loaded to the optical disk apparatus separately. Laser light of the wavelength $\lambda 1$ is emitted from the first emission point 1a in the case where the first optical disk substrate 6 is loaded.

The light which has been transmitted through the polarization hologram substrate 2 is converted by the distributed-type wavelength plate 3 into light comprising a spatial mixture of two types of polarization states (mixed-polarized light). The detailed structure and functions of the distributed-type wavelength plate 3 will be described later. The mixed-polarized light is converged by the objective lens 5 onto a signal surface 6a of the first optical disk substrate 6.

The light (signal light) which has been reflected from the signal surface 6a of the first optical disk substrate 6 propagates in the opposite direction of the forward path. This light (signal light) travels through the objective lens 5 and enters the distributed-type wavelength plate 3. The light transmitted through the distributed-type wavelength plate 3 enters the hologram surface 2a of the polarization hologram substrate 2 so as to be diffracted. Through this diffraction, $1^{st}$ order diffracted light 8 and $-1^{st}$ order diffracted light 8' are formed with respect to the optical axis 7 as an axis of symmetry. The diffracted light 8 and 8' is each converged on the detection surface 9a on the detector 9 via the collimating lens 4. The detection surface 9a is located substantially at the focal plane of the collimating lens 4 (i.e., an imaginary emission point on the light source 1).

The light source 1 in the present embodiment is also capable of emitting light of a different wavelength from that of the first laser light. In the present embodiment, second laser light (wavelength $\lambda 2$, where $\lambda 2 > \lambda 1$) is emitted from the second emission point 1a' on the light source 1 in the case where data is to be recorded on or read from the second optical disk substrate 6'. The second laser light which has been emitted from the second emission point 1a' is reflected from the reflection mirror 10, and thereafter collimated into parallel light by the collimating lens 4. The parallel light is transmitted through the polarization hologram substrate 2 in the form of P-polarized light. The polarization hologram substrate 2 is characterized so that it does not diffract P-polarized light, but diffracts S-polarized light.

The light which has been transmitted through the polarization hologram substrate 2 is converted by the distributed-type wavelength plate 3 into light comprising a spatial mixture of two types of polarization states (mixed-polarized light). The detailed structure and functions of the distributed-type wavelength plate 3 will be described later. The mixed-polarized light is converged by the objective lens 5 onto a signal surface 6a' of the second optical disk substrate 6'.

The light (signal light) which has been reflected from the signal surface 6a' of the second optical disk substrate 6' propagates in the opposite direction of the forward path. This light (signal light) travels through the objective lens 5 and enters the distributed-type wavelength plate 3. The light transmitted through the distributed-type wavelength plate 3 enters the hologram surface 2a of the polarization hologram substrate 2 so as to be diffracted. Through this diffraction, 1$^{st}$ order diffracted light 8 and −1$^{st}$ order diffracted light 8' are formed with respect to the optical axis 7 as an axis of symmetry. Since the second laser light has the wavelength of λ2, which is greater than the wavelength λ1 of the first laser light, the diffraction efficiency for the ±1$^{st}$ order light is about 10% lower than that for the wavelength λ1. The diffracted light 8 and 8' is each converged on the detection surface 9a on the detector 9 via the collimating lens 4.

Figure 6:
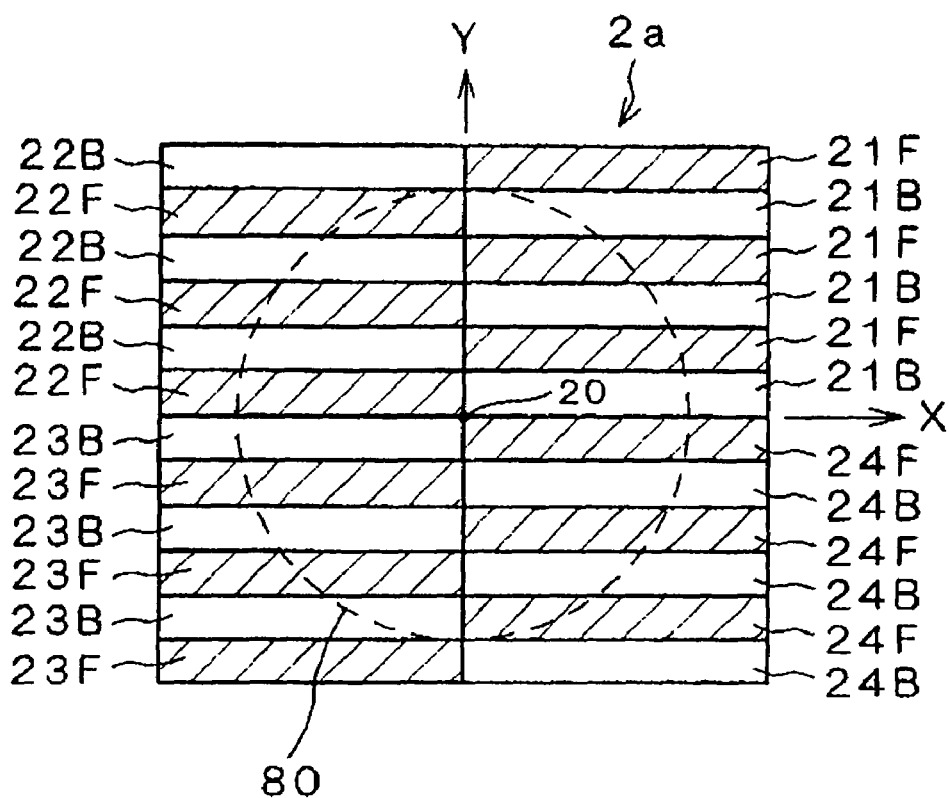
FIG. 6 is a structural diagram showing a hologram surface of a polarization hologram substrate according to the above embodiment.
Figure 7A:
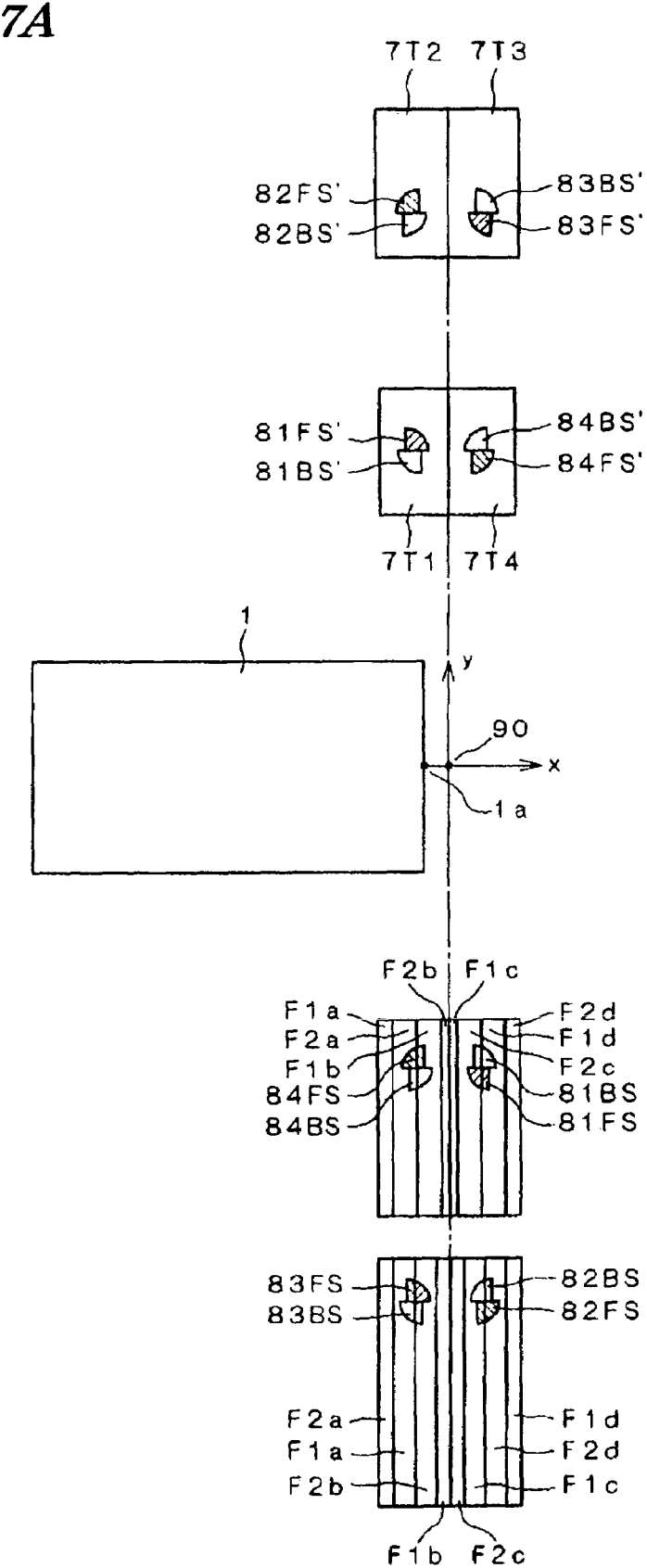
FIG. 7A is a structural diagram showing a photodetection surface according to the above embodiment, and also an explanatory diagram showing a light distribution thereon, illustrating light spots of returned light of first laser light emitted from a first emission point.
Figure 7B:
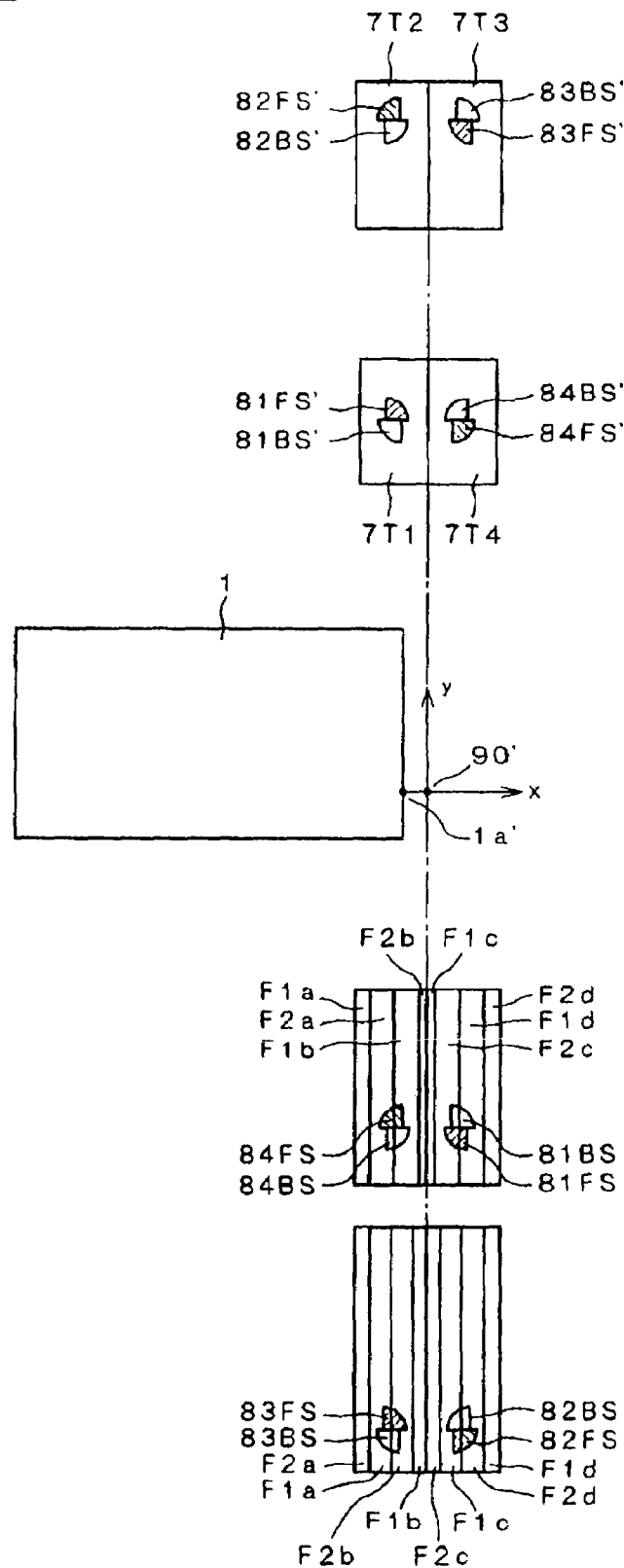
FIG. 7B is a structural diagram showing a photodetection surface according to the above embodiment, and also an explanatory diagram showing a light distribution thereon, illustrating light spots of returned light of second laser light emitted from a second emission point.

FIG. 6 shows the structure of the hologram surface 2a of the polarization hologram substrate 2 in the present embodiment. FIGS. 7A and 7B show the structure of the photodetection surface 9a in the present embodiment. Specifically, FIG. 7A illustrates light spots of returned light of first laser light emitted from the first emission point 1a, whereas FIG. 7B illustrates light spots of returned light of second laser light emitted from the second emission point 1a'.

As shown in FIG. 6, the structure of the hologram surface 2a in the present embodiment is similar to that of the hologram surface 2a shown in FIG. 2B. FIGS. 7A and 7B show x and y axes, which perpendicularly intersect each other at an intersection 90 (or 90') between the detection surface 9a and the optical axis 7 (or 7'). The x and y axes are parallel to the X and Y axes shown in FIG. 6, respectively.

As shown in FIGS. 7A and 7B, in a region corresponding to the "−" side of the y axis on the detection surface 9a, strip-like focus detection cells F1a, F2a, F1b, F2b, F1c, F2c, F1d, and F2d are formed, each of which extends along the y axis. In a region corresponding to the "+" side of the y axis, rectangular tracking detection cells 7T1, 7T2, 7T3, and 7T4 are formed. These detection cells are placed in a symmetrical arrangement with respect to the y axis.

Light which is emitted from the first emission point 1a of the light source 1 travels along a direction parallel to the x axis, within a plane which contains the x axis and is perpendicular to the plane of FIGS. 7A and 7B, so as to be reflected by the reflection mirror 10 in the optical axis direction (i.e., a direction which extends through the point 90 and perpendicularly to the plane of FIGS. 7A and 7B). On the other hand, light which is emitted from the second emission point 1a' of the light source 1 travels along a direction parallel to the x axis, within a plane which contains the x axis and is perpendicular to the plane of FIG. 6, so as to be reflected by the reflection mirror 10 in the optical axis direction (i.e., a direction which extends through the point 90' and perpendicularly to the plane of FIG. 6).

Out of the light 80 entering the hologram surface 2a, 1$^{st}$ order diffracted light which has been diffracted at the strip regions 21B and 21F located in the first quadrant is respectively converged at light spots 81BS and 81FS, each of which lies astride the border between the detection cells F2c and F1d. On the other hand, −1$^{st}$ order diffracted light is converged at light spots 81BS' and 81FS', which fit within the detection cell 7T1.

Moreover, 1$^{st}$ order diffracted light which has been diffracted at the strip regions 22B and 22F located in the second quadrant is respectively converged at light spots 82BS and 82FS, each of which lies astride the border between the detection cells F1c and F2d. On the other hand, −1$^{st}$ order diffracted light is converged at light spots 82BS' and 82FS', which fit within the detection cell 7T2.

Moreover, 1$^{st}$ order diffracted light which has been diffracted at the strip regions 23B and 23F located in the third quadrant is respectively converged at light spots 83BS and 83FS, each of which lies astride the border between the detection cells F1a and F2b. On the other hand, −1$^{st}$ order diffracted light is converged at light spots 83BS' and 83FS', which fit within the detection cell 7T3.

Moreover, 1$^{st}$ order diffracted light which has been diffracted at the strip regions 24B and 24F located in the fourth quadrant is respectively converged at light spots 84BS and 84FS, each of which lies astride the border between the detection cells F2a and F1b. On the other hand, −1$^{st}$ order diffracted light is converged at light spots 84BS' and 84FS', which fit within the detection cell 7T4.

Some of the detection cells are electrically interconnected so that signals F1, F2, T1, T2, T3, and T4 are obtained from the following equations.

F1=signal obtained from the detection cell F1a
+ signal obtained from the detection cell F1b
+ signal obtained from the detection cell F1c
+ signal obtained from the detection cell F1d F2=signal obtained from the detection cell F2a
+ signal obtained from the detection cell F2b
+ signal obtained from the detection cell F2c
+ signal obtained from the detection cell F2d T1=signal obtained from the detection cell 7T1
T2=signal obtained from the detection cell 7T2
T3=signal obtained from the detection cell 7T3
T4=signal obtained from the detection cell 7T4

In FIG. 7B, the second emission point 1a' of the light source 1 is shifted in the y axis direction as compared to the position of the first emission point 1a shown in FIG. 7B. Moreover, the light emitted from the second emission point 1a' has the wavelength λ2, which is greater than the wavelength λ1. Therefore, the hologram has a greater diffraction angle for the light emitted from the second emission point 1a', thus causing changes in the positions of the light spots formed on the detection surface. However, as shown in FIG. 7B, the detection cells 7T1, 7T2, 7T3, and 7T4 are capable of receiving such shifted light spots. Furthermore, on the detection cells F1a, F1b, F1c, F1d, F2a, F2b, F2c, and F2d, light spots will move along the division line (the y axis direction). However, since these detection cells are elongated along the y axis direction, and since the there is little change in the distance between each light spot and the division line, the light of the wavelength λ2 also permits accurate detection of a focus error signal (FE), as does light of the wavelength λ1.

In the present embodiment, with respect to light of the wavelength λ1, the distributed-type wavelength plate 3 imparts a birefringent phase difference of 90+α° in the strip regions 3A (FIG. 3A), and imparts a birefringent phase difference of 90−α° in the strip regions 3B (FIG. 3A). With respect to light of the wavelength λ2, the strip regions 3A imparts a birefringent phase difference of (λ1/λ2)×(90+α)°, whereas the strip regions 3B imparts a birefringent phase difference of (λ1/λ2)×(90−α)°. Therefore, with respect to either light wavelength, a more than zero detected light amount is obtained with respect to an optical disk substrate 6 having a large birefringence, so that signal reading errors or control failure as in the conventional example will not occur.

An alternative structure may be one where, with respect to the wavelength λ1, the distributed-type wavelength plate 3 imparts a birefringent phase difference of 90+α° in the strip regions 3A, and imparts a birefringent phase difference of −270−α° in the strip regions 3B. Such a structure may be realized in the case where, in FIG. 3B, the birefringent layer 3c imparts a birefringent phase difference of 90+α°, whereas the birefringent layers 3a impart a birefringent phase difference of −360−2α°, for example. In this case, with respect to the wavelength λ2, the strip regions 3A will impart a birefringent phase difference of (λ1/λ2)×(90+α)°, whereas the strip regions 3B will impart a birefringent phase difference of ($\lambda 1/\lambda 2$)×(−270−α)°. Assuming α=0°; $\lambda 1$=660 nm; and $\lambda 2$=790 nm, for example, this situation corresponds to the case where there is no phase difference between the strip regions 3A and 3B with respect to the wavelength $\lambda 1$, whereas there is a phase difference of 60° between the strip regions 3A and 3B with respect to the wavelength $\lambda 2$. In this case, a countermeasure to birefringence is being provided only with respect to the wavelength $\lambda 2$, whereas the same optical performance as in the conventional example is provided with respect to the wavelength $\lambda 1$. On the other hand, assuming that α=15°; $\lambda 1$=660 nm; and $\lambda 2$=790 nm, there is a phase difference of 30° between the strip regions 3A and 3B with respect to the wavelength $\lambda 1$, whereas there is a phase difference of 34° between the strip regions 3A and 3B with respect to the wavelength $\lambda 2$. In this case, a countermeasure to birefringence is being provided for both wavelengths $\lambda 1$ and $\lambda 2$, with a stronger countermeasure being provided for the wavelength $\lambda 2$. By changing the value of α, the phase difference balance can be adjusted.

Embodiment 3

Next, with reference to FIGS. 8, 9A, and 7B, an optical disk apparatus according to a third embodiment of the present invention will be described. Except for the pattern of the polarization hologram surface 2a, the detection pattern on the photodetection surface 9a, and the light distribution thereupon, the optical disk apparatus of the present embodiment is identical in construction to the optical disk apparatus of Embodiment 2. Therefore, any descriptions which would be similar to those in Embodiment 2 will be omitted.

Figure 8:
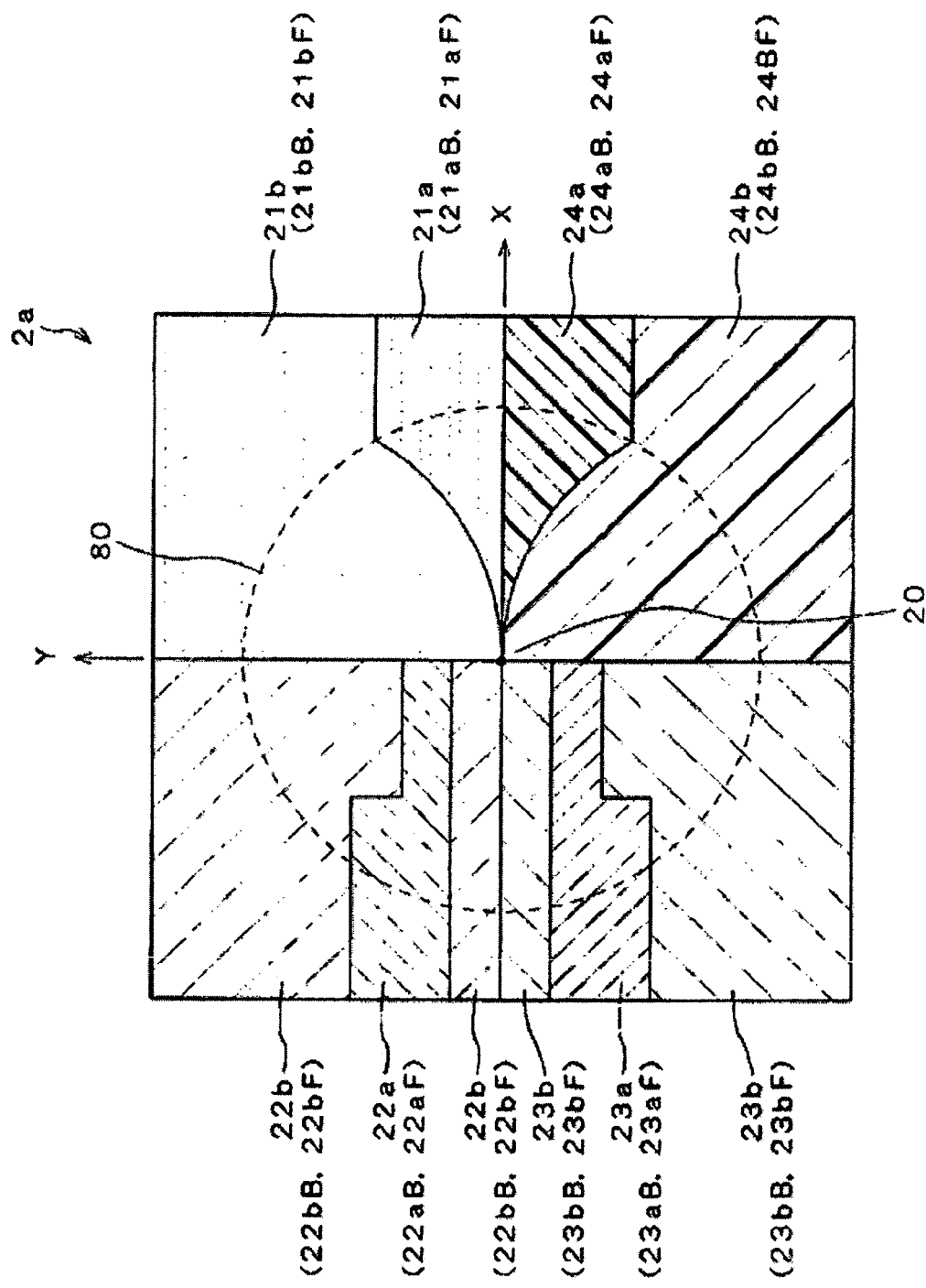
FIG. 8 is a structural diagram showing a hologram surface of a polarization hologram substrate to be used in an optical disk apparatus according to another embodiment of the present invention.

FIG. 8 shows the structure of the hologram surface 2a of the polarization hologram substrate 2 in the present embodiment. FIGS. 9A and 9B show the photodetection surface 9a in the present embodiment. Both FIG. 8 and FIGS. 9A and 9B are plan views showing the hologram surface 2a and the photodetection surface 9a, respectively, as viewed from the side of the optical disk 6. Specifically, FIG. 9A illustrates light spots of returned light of first laser light emitted from a first emission point 1a, whereas FIG. 9B illustrates light spots of returned light of second laser light emitted from a second emission point 1a'.

As shown in FIG. 8, the hologram surface 2a is divided into four portions (quadrants) by two lines (X and Y axes) which perpendicularly intersect each other at an intersection 20 between the hologram surface 2a and the optical axis 7. The Y axis corresponds to a radial direction. The first quadrant is divided into two regions 21a and 21b; the second quadrant is divided into two regions 22a and 22b; the third quadrant is divided into two regions 23a and 23b; and the fourth quadrant is divided into two regions 24a and 24b.

Although not explicitly shown in FIG. 8, each region is further divided into strip-like regions with the suffix B and strip-like regions with the suffix F (e.g., regions 21aB and regions 21aF), each strip region extending along the X direction, in a manner similar to FIG. 6 of Embodiment 2. Portions of the regions 21a and 24a which lie within the aperture (denoted by a circle 80) are some of the regions which do not contain any $\pm 1^{st}$ order diffracted light from a disk groove on a CD-R/RW or the like. Portions of the regions 22a and 23a which lie within the aperture are some of the regions which do not contain any $\pm 1^{st}$ order diffracted light from a disk groove on a DVD-R/RW or the like. Consistently with earlier descriptions, the suffix B represents $+1^{st}$ order diffracted light which is converged after the detection surface, whereas the suffix F represents light which is converged before the detection surface. For simplicity, FIGS. 9A and 9B only show light spots corresponding to the suffix B.

Figure 9A:
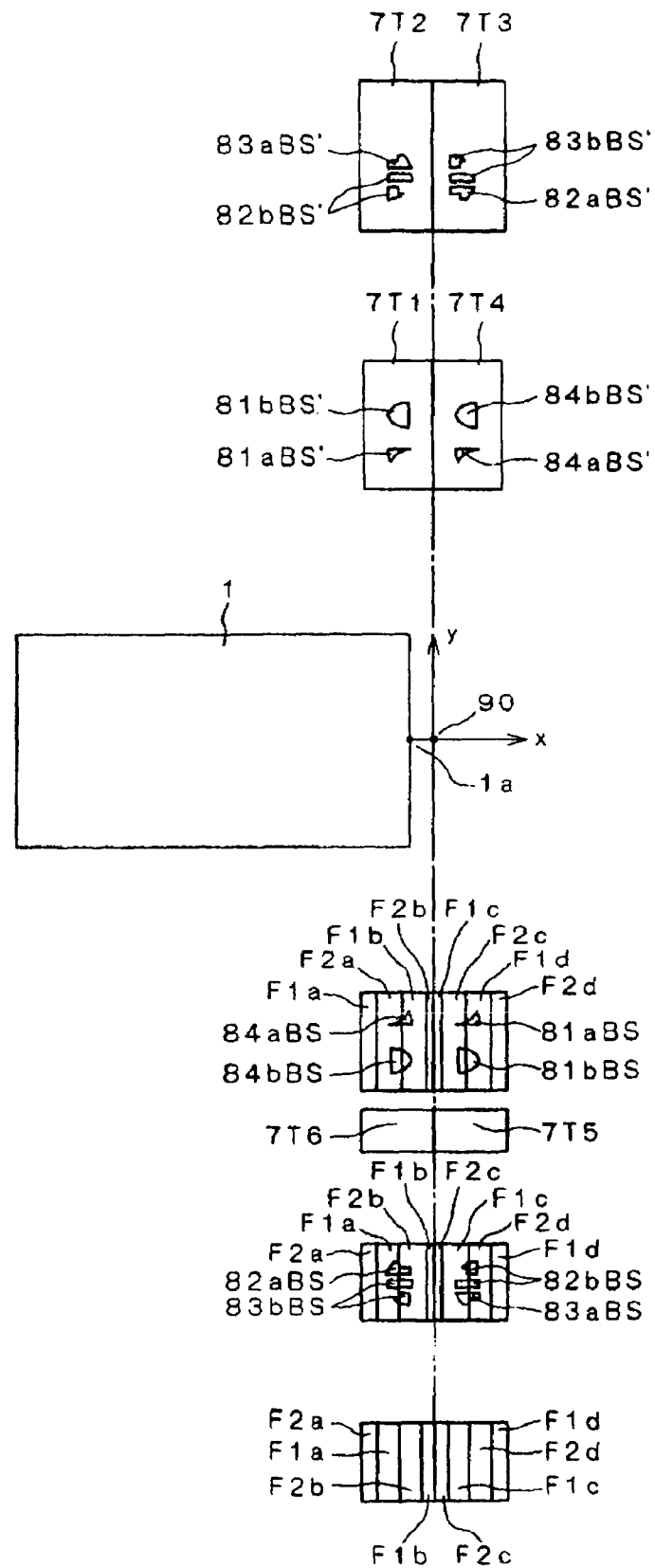
FIG. 9A is a structural diagram showing a photodetection surface according to the above embodiment, and also an explanatory diagram showing a light distribution thereon, illustrating light spots of returned light of first laser light emitted from a first emission point.
Figure 9B:
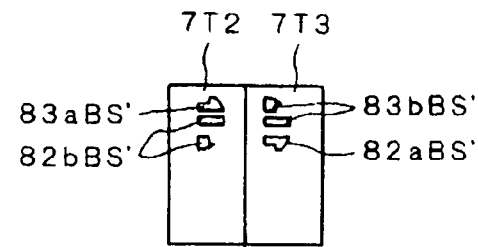
FIG. 9B is a structural diagram showing a photodetection surface according to the above embodiment, and also an explanatory diagram showing a light distribution thereon, illustrating light spots of returned light of second laser light emitted from a second emission point.
Figure 9B:
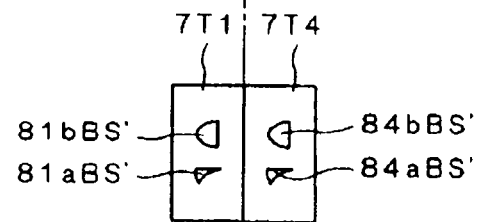
Figure 9B:
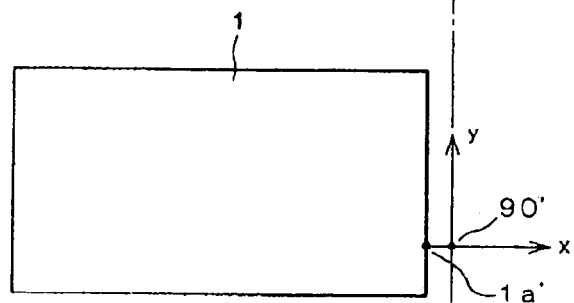
Figure 9B:
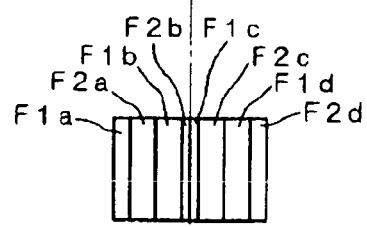
Figure 9B:
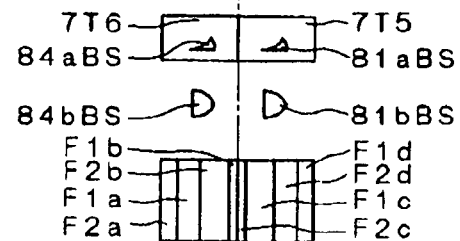
Figure 9B:
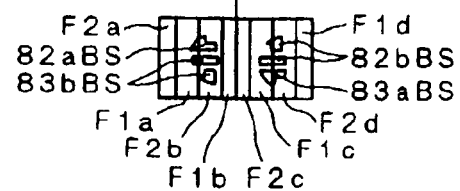

FIGS. 9A and 9B show x and y axes, which perpendicularly intersect each other at an intersection 90 (or 90') between the detection surface 9a and the optical axis 7 (or 7'). The x and y axes are parallel to the X and Y axes shown in FIG. 8, respectively. In a region corresponding to the "−" side of the y axis, strip-like focus detection cells F1a, F2a, F1b, F2b, F1c, F2c, F1d, and F2d are formed, each of which extends along the y axis, and detection cells 7T5 and 7T6 for tracking correction are also formed. In a region corresponding to the "+" side of the y axis, rectangular tracking detection cells 7T1, 7T2, 7T3, and 7T4 are formed. These detection cells are placed in a symmetrical arrangement with respect to the y axis. Light which is emitted from the emission point 1a or 1a' of the light source 1 travels along a direction parallel to the x axis, within a plane which contains the x axis and is perpendicular to the plane of FIGS. 9A and 9B, so as to be reflected by the reflection mirror 10 in the optical axis direction (i.e., a direction which extends through the point 90 or 90' and perpendicularly to the plane of FIGS. 9A and 9B).

Out of the light (incident light 80) entering the hologram surface 2a, $+1^{st}$ order diffracted light which has been diffracted at the strip regions 21aB and 21aF in the region 21a and the strip regions 21bB and 21bF in the region 21b located in the first quadrant is respectively converged at light spots 81aBS and 81aFS and light spots 81bBS and 81bFS, each of which lies astride the border between the detection cells F2c and F1d. On the other hand, $-1^{st}$ order diffracted light is converged at light spots 81aBS' and 81aFS' and light spots 81bBS' and 81bFS', which fit within the detection cell 7T1.

Moreover, $+1^{st}$ order diffracted light which has been diffracted at the strip regions 22aB and 22aF in the region 22a located in the second quadrant is respectively converged at light spots 82aBS and 82aFS, each of which lies astride the border between the detection cells F1a and F2b. On the other hand, $-1^{st}$ order diffracted light is converged at light spots 82aBS' and 82aFS', which fit within the detection cell 7T3. Furthermore, $+1^{st}$ order diffracted light which has been diffracted at the strip regions 22bB and 22bF in the region 22b located in the second quadrant is respectively converged at light spots 82bBS and 82bFS, each of which lies astride the border between the detection cells F1c and F2d. On the other hand, $-1^{st}$ order diffracted light is converged at light spots 82bBS' and 82bFS', which fit within the detection cell 7T2.

Moreover, $+1^{st}$ order diffracted light which has been diffracted at the strip regions 23aB and 23aF in the region 23a located in the third quadrant is respectively converged at light spots 83aBS and 83aFS, each of which lies astride the border between the detection cells F1c and F2d. On the other hand, $-1^{st}$ order diffracted light is converged at light spots 83aBS' and 83aFS', which fit within the detection cell 7T2. Furthermore, $+1^{st}$ order diffracted light which has been diffracted at the strip regions 23bB and 23bF in the region 23b located in the third quadrant is respectively converged at light spots 83bBS and 83bFS, each of which lies astride the border between the detection cells F1a and F2b. On the other hand, $-1^{st}$ order diffracted light is converged at light spots 83bBS' and 83bFS', which fit within the detection cell 7T3.

Moreover, $1^{st}$ order diffracted light which has been diffracted at the strip regions 24aB and 24aF in the region 24a and the strip regions 24bB and 24bF in the region 24b located in the fourth quadrant is respectively converged at light spots 84aBS and 84aFS and light spots 84bBS and 84bFS, each of which lies astride the border between the detection cells F2a and F1b. On the other hand, $-1^{st}$ order diffracted light is converged at light spots 84aBS' and 84aFS' and light spots 84bBS' and 84bFS', which fit within the detection cell 7T4.

Some of the detection cells are electrically interconnected so that eight signals F1, F2, T1, T2, T3, T4, T5, and T6 are obtained as follows.

F1=signal obtained from the detection cell F1a
  + signal obtained from the detection cell F1b
  + signal obtained from the detection cell F1c
  + signal obtained from the detection cell F1d
F2=signal obtained from the detection cell F2a
  + signal obtained from the detection cell F2b
  + signal obtained from the detection cell F2c
  + signal obtained from the detection cell F2d
T1=signal obtained from the detection cell 7T1
T2=signal obtained from the detection cell 7T2
T3=signal obtained from the detection cell 7T3
T4=signal obtained from the detection cell 7T4
T5=signal obtained from the detection cell 7T5
T6=signal obtained from the detection cell 7T6

In FIG. 9B, the emission point of the light source 1 is at the point 1a', where the light source emits light of the wavelength $\lambda 2$, which is greater than $\lambda 1$. Therefore, the hologram has a greater diffraction angle for the light emitted from the emission point 1a', thus causing changes in the positions of the light spots. The detection cells 7T1, 7T2, 7T3, and 7T4 receive light spots similar to those shown in FIG. 9A. The light spots 81aBS and 81aFS and the light spots 84aBS and 84aFS fit within the detection cells 7T5 and 7T6, respectively, whereas the light spots 81bBS and 81bFS and the light spots 84bBS and 84bFS fall outside the detection cells. On the other hand, the positions of the light spots 82aBS, 82aFS, 83bBS, 83bFS, 82bBS, 82bFS, 83aBS, and 83aFS are changed, but after all, these light spots are received by detection cells in a similar manner to FIG. 9A.

The y axis shown in FIGS. 9A and 9B is parallel to a radial direction of the optical disk substrate 6. A focus error signal FE for the optical disk signal surface 6a, a tracking error signal TE1 for the optical disk corresponding to the wavelength $\lambda 1$, a tracking error signal TE2 for the optical disk corresponding to the wavelength $\lambda 2$, and a reproduction signal RF from the optical disk signal surface 6a are detected based on eq. 4, eq. 5, eq. 6, and eq. 7 below.

$$FE = F1 - F2 \quad \text{(eq. 4)}$$

$$TE1 = \alpha(T1-T4) + \beta(T2-T3) \quad \text{(eq. 5)}$$

$$TE2 = (T1-T4) + \gamma(T5-T6) \quad \text{(eq. 6)}$$

$$RF = T1 + T2 + T3 + T4 \quad \text{(eq. 7)}$$

For example, eq. 5 is used for an optical disk such as a DVD-RAM or a DVD-R/RW. In the case of an optical disk such as a DVD-RAM, $\alpha$ and $\beta$ are prescribed so that $\alpha=1$, $\beta=0$. In the case of an optical disk such as a DVD-R/RW, $\alpha$ and $\beta$ are prescribed so that $\alpha=0$, $\beta=1$.

On the other hand, eq. 6 is used for an optical disk such as a CD-R/RW. The signal (T1–T4) corresponds to the usual TE signal being detected through a semicircular aperture, and is identical in characteristics to the usual TE signal. The signal (T2–T3) is a TE signal detected with some of the regions (22a and 23a) in the aperture being swapped. Since the swapped regions (22a and 23a) will not contain any $\pm 1^{st}$ order diffracted light for a DVD-R/RW disk, no deterioration in the TE sensitivity for a DVD-R/RW disk will result. The swapping serves to cancel influences such as: the influence of the eccentricity of the objective lens along an optical disk radial direction; the influence of any tilt of the optical disk substrate 6; and the influence exerted when a light spot rests on a border between a recorded region and an unrecorded region on the optical disk signal surface 6a.

On the other hand, the signal (T5–T6) which is obtained in the case shown in FIG. 9B is a difference signal detected by extracting only some of the regions (21a and 24a) within the aperture, and is a difference signal in the regions which will not contain any $\pm 1^{st}$ order diffracted light for a CD-R/RW disk. Thus, the signal (T5–T6) has a zero TE sensitivity for a CD-R/RW disk, and as compared to the usual TE signal (i.e., the signal (T1–T4)), the signal (T5–T6) has a quite different dependence on influences such as: the influence of the eccentricity of the objective lens along an optical disk radial direction; the influence of any tilt of the optical disk substrate 6; and the influence exerted when a light spot rests on a border between a recorded region and an unrecorded region on the optical disk signal surface 6a. Therefore, through the calculation as expressed by eq. 6, which also involves the signal (T1–T4), such influences can be canceled without degrading the TE sensitivity. Although the focus error signal FE of the case shown in FIG. 9B is detected through a semicircular aperture, there is little disk-groove related influences since the aperture constitutes one of the semicircles as divided along an optical disk radial direction. Thus, substantially equivalent characteristics to those attained by full circle detection, which is a conventional detection technique, can be obtained.

In the present embodiment, a distributed-type wavelength plate 3 which is similar to that of Embodiment 2 is used. Therefore, the counteracting effects against any birefringence of the optical disk substrate 6 are quite similar to those provided in Embodiment 2. Furthermore, by allowing the calculation result of eq. 5 or eq. 6 to be used as a tracking error signal, the present embodiment enables tracking control free of off-tracking, even in the case where the objective lens has an eccentricity along an optical disk radial direction, where the optical disk substrate 6 is tilted, or where a light spot rests on a border between a recorded region and an unrecorded region on the optical disk recording surface 6a and is susceptible to the influence from an adjoining track.

Embodiment 4

Next, with reference to FIGS. 10 and 11, an optical disk apparatus according to a fourth embodiment of the present invention will be described. Except for the pattern of the polarization hologram surface 2a, the detection pattern on the photodetection surface 9a, and the light distribution thereupon, the optical disk apparatus of the present embodiment is identical in construction to the optical disk apparatus of Embodiment 2. Therefore, any descriptions which would be similar to those in Embodiment 2 will be omitted.

Figure 10:
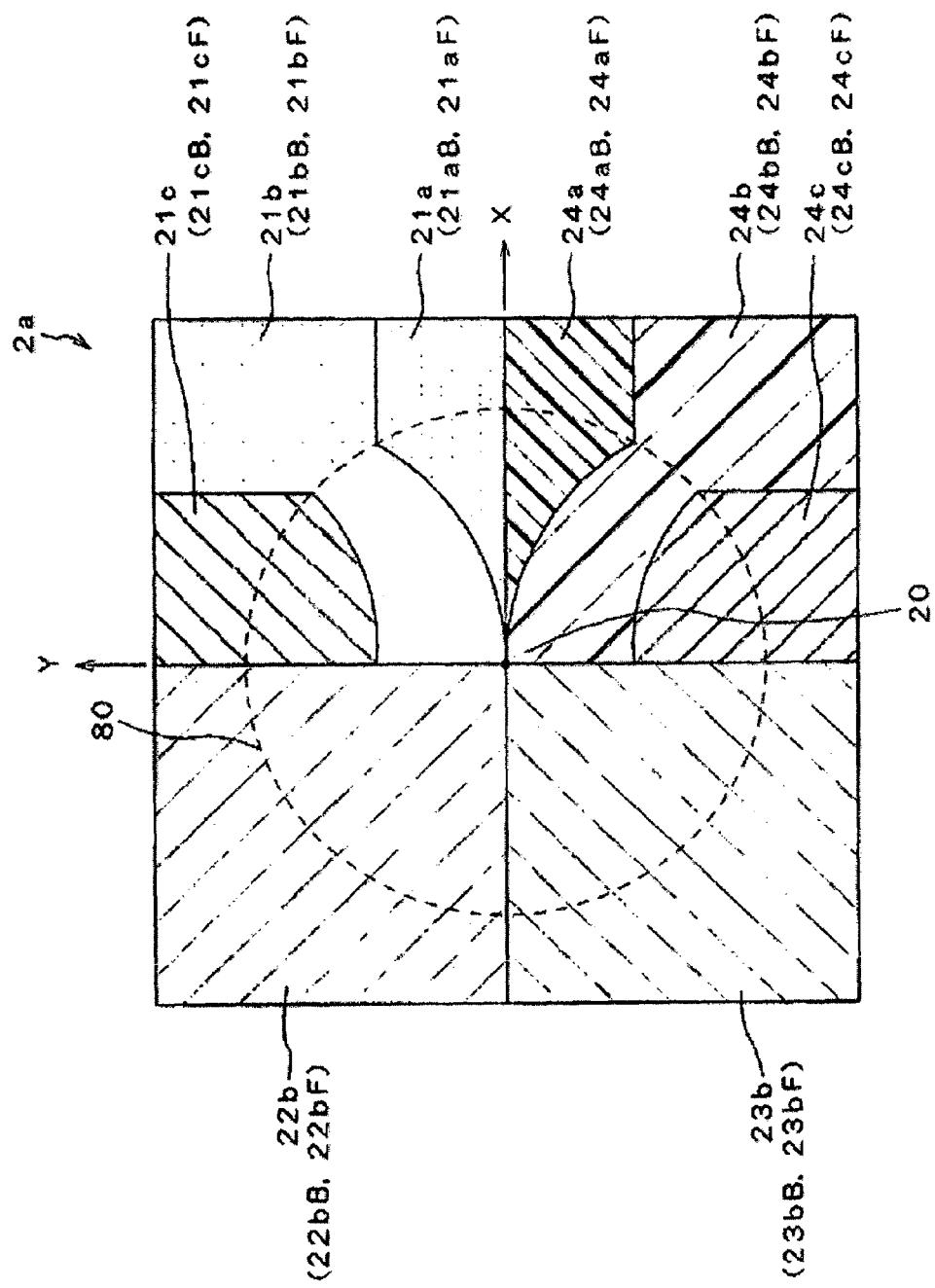
FIG. 10 is a structural diagram showing a hologram surface of a polarization hologram substrate 2 to be used in an optical disk apparatus according to another embodiment of the present invention.
Figure 11A:
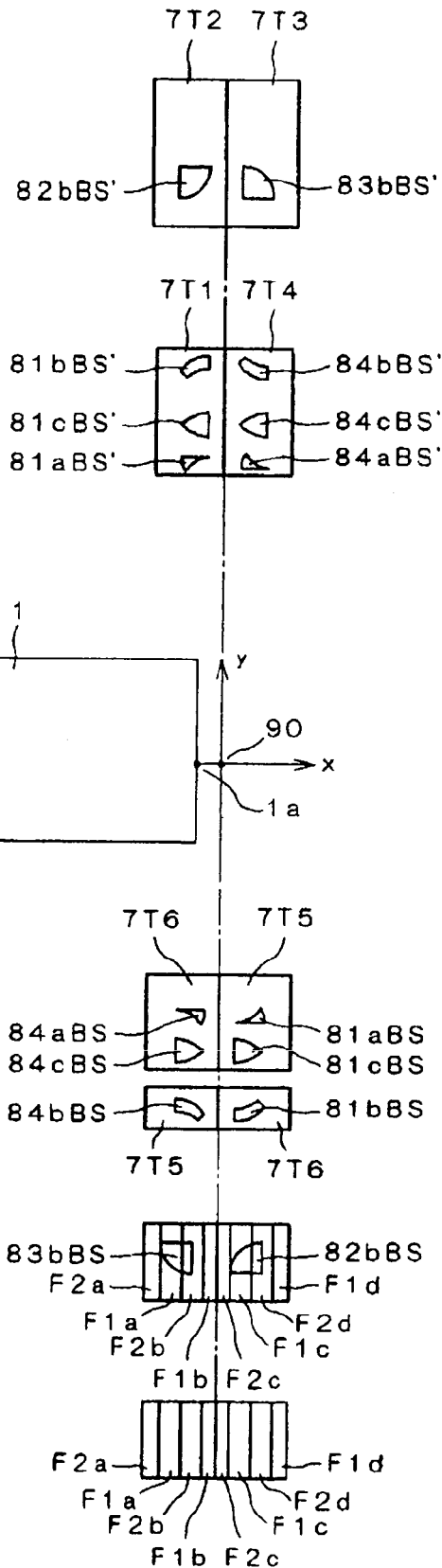
FIG. 11A is a structural diagram showing a photodetection surface according to the above embodiment, and also an explanatory diagram showing a light distribution thereon, illustrating light spots of returned light of first laser light emitted from a first emission point.
Figure 11B:
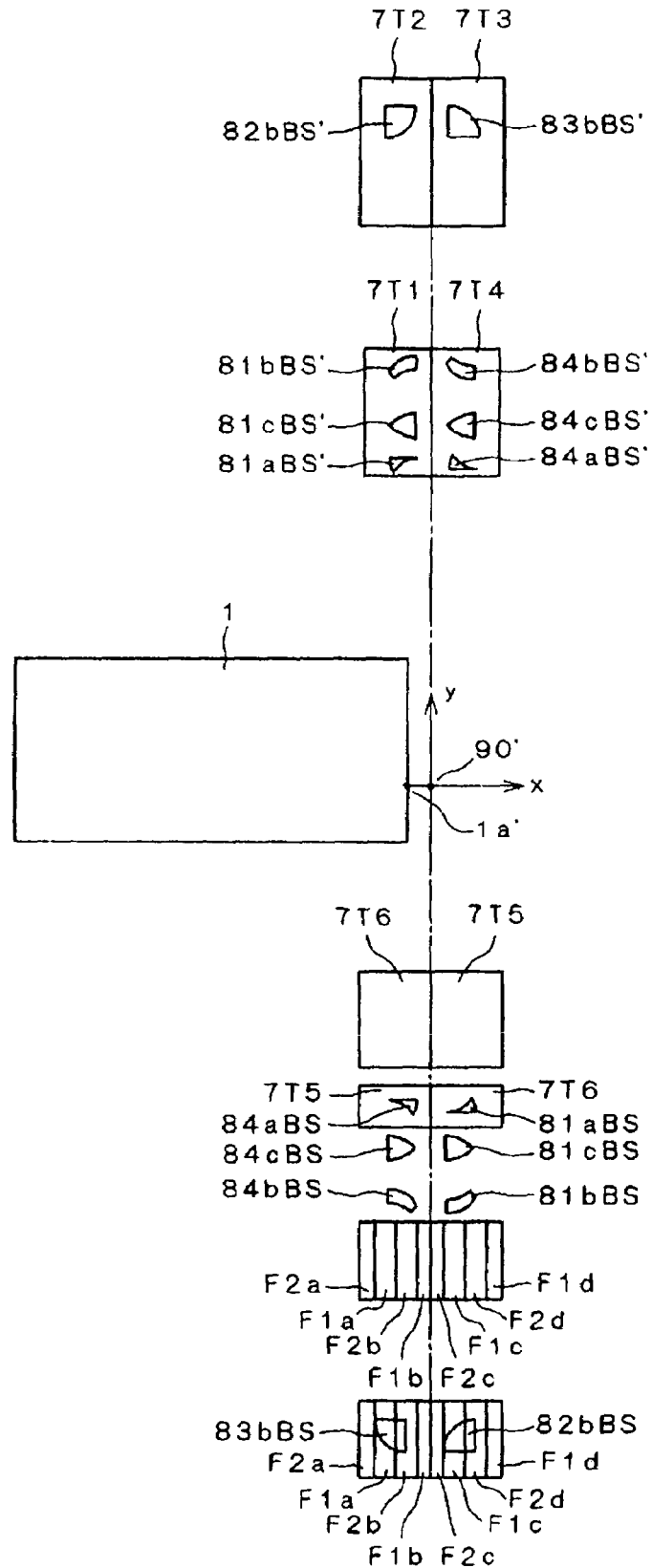
FIG. 11B is a structural diagram showing a photodetection surface according to the above embodiment, and also an explanatory diagram showing a light distribution thereon, illustrating light spots of returned light of second laser light emitted from a second emission point.

FIG. 10 shows the structure of the hologram surface 2a of the polarization hologram substrate 2 in the present embodiment. FIGS. 11A and 11B show the photodetection surface in the present embodiment. Both FIG. 10 and FIGS. 11A and 11B are plan views showing the hologram surface and the photodetection surface, respectively, as viewed from the side of the optical disk 6. Specifically, FIG. 11A illustrates light spots of returned light of first laser light emitted from a first emission point 1a, whereas FIG. 11B illustrates light spots of returned light of second laser light emitted from a second emission point 1a'.

As shown in FIG. 10, the hologram surface 2a is divided into four portions (quadrants) by two lines (X and Y axes) which perpendicularly intersect each other at an intersection 20 between the hologram surface 2a and the optical axis 7.

The Y axis corresponds to a radial direction. The first quadrant is divided into three regions 21a, 21b, and 21c; the second quadrant only has one region 22b; the third quadrant only has one region 23b; and the fourth quadrant is divided into three regions 24a, 24b, and 24c. Although not explicitly shown in FIG. 10, each region is further divided into strip-like regions with the suffix B and strip-like regions with the suffix F (e.g., regions 21aB and regions 21aF), each strip region extending along the X direction, in a manner similar to FIG. 6 of Embodiment 2. Portions of the regions 21a and 24a which lie within the aperture (denoted by a circle 80) are some of the regions which do not contain any ±1$^{st}$ order diffracted light from a disk groove on a CD-R/RW or the like. Portions of the regions 21b and 24b which lie within the aperture are some of the regions which do not contain any ±1$^{st}$ order diffracted light from a disk groove on a DVD-R/RW or the like. Consistently with earlier descriptions, the suffix B represents +1$^{st}$ order diffracted light which is converged after the detection surface, whereas the suffix F represents light which is converged before the detection surface. For simplicity, FIGS. 11A and 11B only show light spots corresponding to the suffix B.

FIGS. 11A and 11B show x and y axes, which perpendicularly intersect each other at an intersection 90 (or 90') between the detection surface 9a and the optical axis 7 (or 7'). The x and y axes are parallel to the X and Y axes shown in FIG. 10, respectively. In a region corresponding to the "−" side of the y axis, strip-like focus detection cells F1a, F2a, F1b, F2b, F1c, F2c, F1d, and F2d are formed, each of which extends along the y axis, and detection cells 7T5 and 7T6 for tracking correction are also formed. In a region corresponding to the "+" side of the y axis, rectangular tracking detection cells 7T1, 7T2, 7T3, and 7T4 are formed. These detection cells are placed in a symmetrical arrangement with respect to the y axis. Light which is emitted from the emission point 1a or 1a' of the light source 1 travels along a direction parallel to the x axis, within a plane which contains the x axis and is perpendicular to the plane of FIGS. 11A and 11B, so as to be reflected by the reflection mirror 10 in the optical axis direction (i.e., a direction which extends through the point 90 or 90' and perpendicularly to the plane of FIGS. 11A and 11B).

Out of the light (incident light 80) entering the hologram surface 2a, +1$^{st}$ order diffracted light which has been diffracted at the strip regions 21aB and 21aF in the region 21a and the strip regions 21cB and 21cF in the region 21c located in the first quadrant is respectively converged at light spots 81aBS and 81aFS and light spots 81cBS and 81cFS, which fit within the detection cell 7T5. On the other hand, −1$^{st}$ order diffracted light is converged at light spots 81aBS' and 81aFS' and light spots 81cBS' and 81cFS', which fit within the detection cell 7T1. Moreover, +1$^{st}$ order diffracted light which has been diffracted at the strip regions 21bB and 21bF in the region 21b located in the first quadrant is respectively converged at light spots 81bBS and 81bFS, which fit within the detection cell 7T6. On the other hand, −1$^{st}$ order diffracted light which has been diffracted at the strip regions 21bB and 21bF in the region 21b located in the first quadrant is respectively converged at light spots 81bBS' and 81bFS', which fit within the detection cell 7T1.

Moreover, +1$^{st}$ order diffracted light which has been diffracted at the strip regions 22bB and 22bF in the region 22b located in the second quadrant is respectively converged at light spots 82bBS and 82bFS, each of which lies astride the border between the detection cells F1c and F2d. On the other hand, −1$^{st}$ order diffracted light is converged at light spots 82bBS' and 82bFS', which fit within the detection cell 7T2.

Moreover, +1$^{st}$ order diffracted light which has been diffracted at the strip regions 23bB and 23bF in the region 23b located in the third quadrant is respectively converged at light spots 83bBS and 83bFS, each of which lies astride the border between the detection cells F1a and F2b. On the other hand, −1$^{st}$ order diffracted light is converged at light spots 83bBS' and 83bFS', which fit within the detection cell 7T3.

Moreover, +1$^{st}$ order diffracted light which has been diffracted at the strip regions 24aB and 24aF in the region 24a and the strip regions 24cB and 24cF in the region 24c located in the fourth quadrant is respectively converged at light spots 84aBS and 84aFS and light spots 84cBS and 84cFS, which fit within the detection cell 7T6. On the other hand, −1$^{st}$ order diffracted light is converged at light spots 84aBS' and 84aFS' and light spots 84cBS' and 84cFS', which fit within the detection cell 7T4. Furthermore, +1$^{st}$ order diffracted light which has been diffracted at the strip regions 24bB and 24bF in the region 24b located in the fourth quadrant is respectively converged at light spots 84bBS and 84bFS, which fit within the detection cell 7T5. On the other hand, −1$^{st}$ order diffracted light is converged at light spots 84bBS' and 84bFS', which fit within the detection cell 7T4.

Some of the detection cells are electrically interconnected so that eight signals F1, F2, T1, T2, T3, T4, T5, and T6 are obtained as follows.

F1=signal obtained from the detection cell F1a
  + signal obtained from the detection cell F1b
  + signal obtained from the detection cell F1c
  + signal obtained from the detection cell F1d
F2=signal obtained from the detection cell F2a
  + signal obtained from the detection cell F2b
  + signal obtained from the detection cell F2c
  + signal obtained from the detection cell F2d
T1=signal obtained from the detection cell 7T1
T2=signal obtained from the detection cell 7T2
T3=signal obtained from the detection cell 7T3
T4=signal obtained from the detection cell 7T4
T5=signal obtained from the detection cell 7T5
T6=signal obtained from the detection cell 7T6

In FIG. 11B, the emission point of the light source 1 is at the point 1a', where the light source emits light of the wavelength λ2, which is greater than λ1. Therefore, the hologram has a greater diffraction angle for the light emitted from the emission point 1a', thus causing changes in the positions of the light spots. The detection cells 7T1, 7T2, 7T3, and 7T4 receive light spots similar to those shown in FIG. 11A. The light spots 81aBS and B1aFS and the light spots 84aBS and 84aFS fit within the detection cells 7T6 and 7T5, respectively, whereas the light spots 81bBS, 81bFS, 81cBS, and 81cFS and the light spots 84bBS, 84bFS, 84cBS, and 84cFS fall outside the detection cells. On the other hand, the positions of the light spots 82bBS, 82bFS, 83bBS, and 83bFS are changed, but after all, these light spots are received by detection cells in a similar manner to FIG. 11A.

Assuming that the y axis shown in FIGS. 11A and 11B is parallel to a radial direction of the optical disk substrate 6, a focus error signal FE for the optical disk signal surface 6a and a reproduction signal RF from the optical disk signal surface 6a are detected based on eq. 4 and eq. 7 above. On the other hand, a tracking error signal TE1 for the optical disk corresponding to the wavelength λ1 and a tracking error signal TE2 for the optical disk corresponding to the wavelength λ2 are detected based on eq. 8 and eq. 9 below.

$$TE1 = \alpha(T1+T2-T3-T4) + \beta(T5-T6) \quad \text{(eq. 8)}$$

$$TE2 = (T1+T2-T3-T4) + \gamma(T6-T5) \quad \text{(eq. 9)}$$

For example, eq. 8 is used for an optical disk such as a DVD-RAM or a DVD-R/RW. In the case of an optical disk such as a DVD-RAM, a and β are prescribed so that a=1, β=0. In the case of an optical disk such as a DVD-R/RW, a and β are prescribed so that α=0, β=1. On the other hand, eq. 9 is used for an optical disk such as a CD-R/RW. The signal (T1+T2−T3−T4) corresponds to the usual TE signal.

The signal (T5−T6) in the case shown in FIG. 11A is a TE signal detected with some of the regions (21b and 24b) in the aperture being swapped. Since the swapped regions (21b and 24b) will not contain any ±1$^{st}$ order diffracted light for a DVD-R/RW disk, no deterioration in the TE sensitivity for a DVD-R/RW disk will result. The swapping serves to cancel influences such as: the influence of the eccentricity of the objective lens along an optical disk radial direction; the influence of any tilt of the optical disk substrate 6; and the influence exerted when a light spot rests on a border between a recorded region and an unrecorded region on the optical disk signal surface 6a. On the other hand, the signal (T6−T5) which is obtained in the case shown in FIG. 11A is a difference signal detected by extracting only some of the regions (21a and 24a) within the aperture, and is a difference signal in the regions which will not contain any ±1$^{st}$ order diffracted light for a CD-R/RW disk. Thus, the signal (T6−T5) has a zero TE sensitivity for a CD-R/RW disk, and as compared to the usual TE signal (i.e., the signal (T1+T2−T3−T4)), the signal (T6−T5) has a quite different dependence on influences such as: the influence of the eccentricity of the objective lens along an optical disk radial direction; the influence of any tilt of the optical disk substrate 6; and the influence exerted when a light spot rests on a border between a recorded region and an unrecorded region on the optical disk signal surface 6a. Therefore, through the calculation as expressed by eq. 9, which also involves the signal (T1+T2−T3−T4), such influences can be canceled without degrading the TE sensitivity. Although the focus error signal FE of the case shown in FIGS. 11A and 11B is detected through a semicircular aperture, there is little disk-groove related influences since the aperture constitutes one of the semicircles as divided along an optical disk radial direction. Thus, substantially equivalent characteristics to those attained by full circle detection, which is a conventional detection technique, can be obtained.

In the present embodiment, a distributed-type wavelength plate 3 which is similar to that of Embodiment 2 is used. Therefore, the counteracting effects against any birefringence of the optical disk substrate 6 are quite similar to those provided in Embodiment 2. Furthermore, by allowing the calculation result of eq. 8 or eq. 9 to be used as a tracking error signal, the present embodiment enables tracking control free of off-tracking, even in the case where the objective lens has an eccentricity along an optical disk radial direction, where the optical disk substrate 6 is tilted, or where a light spot rests on a border between a recorded region and an unrecorded region on the optical disk recording surface 6a and is susceptible to the influence from an adjoining track.

Embodiment 5

Figure 12:
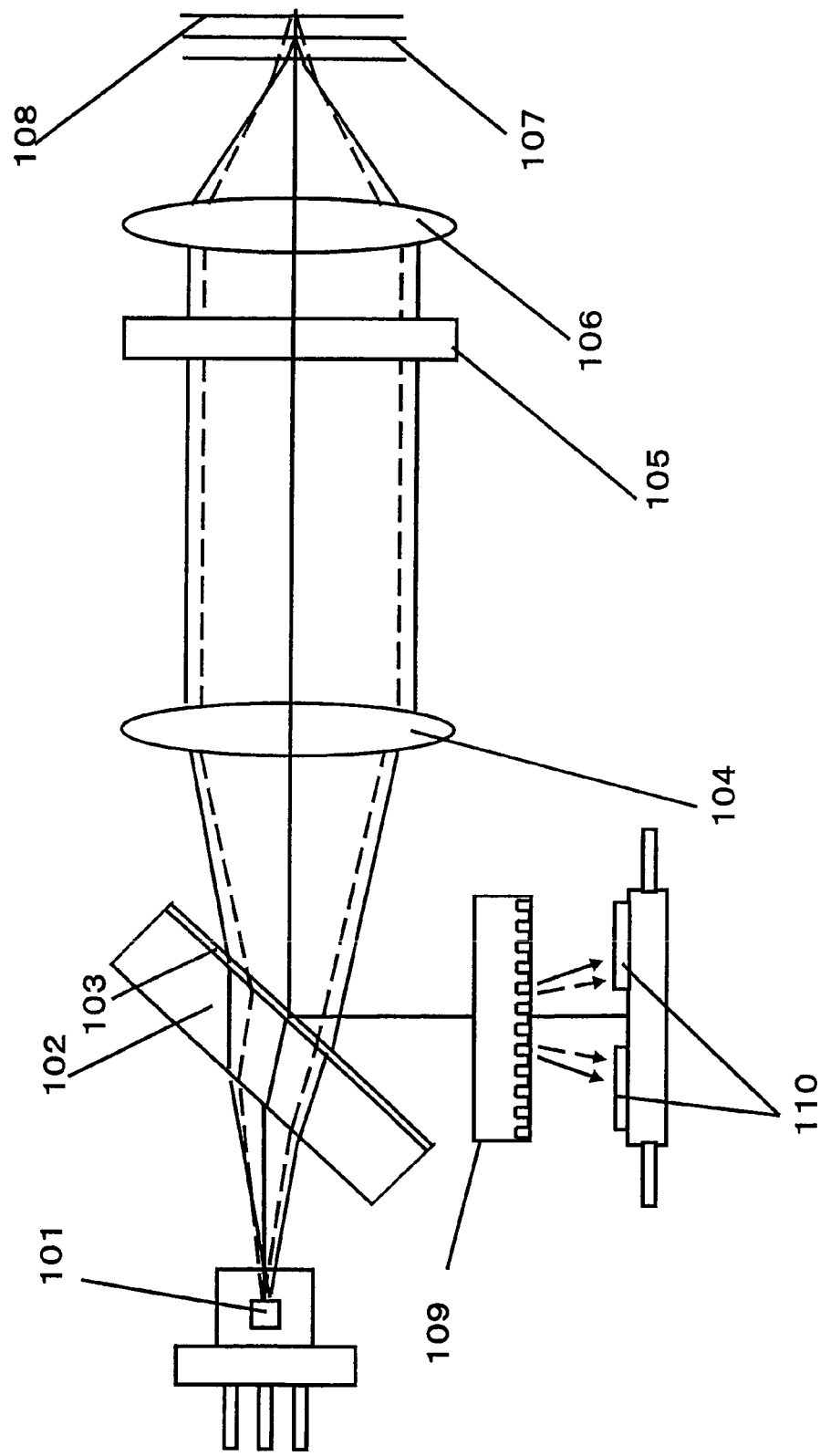
FIG. 12 is an essential structural diagram showing an optical pickup according to an embodiment of the present invention.

Referring to FIGS. 12 and 13, an optical disk apparatus according to a fifth embodiment of the present invention will be described. Hereinafter, like components will be denoted by like reference numerals.

FIG. 12 is an essential structural diagram showing an optical pickup of the optical disk apparatus according to the present embodiment. The optical pickup includes a light source 101, which incorporates a laser chip capable of emitting light of different wavelengths. The light source 101 emits light of a relatively short wavelength for DVDs and light of a relatively long wavelength for CDs.

Although FIG. 12 illustrates both an optical information medium 107 and an optical information medium 108, in reality, an arbitrarily selected one of the optical information mediums 107 and 108 is to be mounted. Depending on the type of optical information medium mounted, light of an appropriate wavelength is to be emitted from the light source 101. Light (signal light or reproduction light) which is reflected from the optical information medium 107 or 108 enters a photodetector 110, which is used in common for both DVDs and CDs.

The optical path of light from the light source 101 to the optical information medium 107 or 108 and the optical path of light (signal light) being reflected from the optical information medium 107 or 108 and traveling toward the photodetector 110 are separated by a prism having a polarization beam splitter film 103 formed on its surface. Assuming that the linearly polarized light emitted from the light source 101 is P-polarized light, the polarization beam splitter film 103 is designed so as to allow P-polarized light to be transmitted therethrough. The P-polarized light having been transmitted through the polarization beam splitter film 103 is transmitted through the wavelength plate 105, and thereafter reflected from the optical information medium 107 or 108, so as to be transmitted back through the wavelength plate 105 in the opposite direction. The returned light (signal light), at entry into the polarization beam splitter film 103, is in such a polarization state that it contains a large amount of S-polarized light components having a polarization axis which is substantially perpendicular to the polarization axis of p-polarized light.

Since the polarization beam splitter film 103 reflects S-polarized light, most of the signal light is reflected toward the photodetector 110. This reflected light is diffracted by a hologram 109 so as to enter the photodetector 110.

Figure 13A:
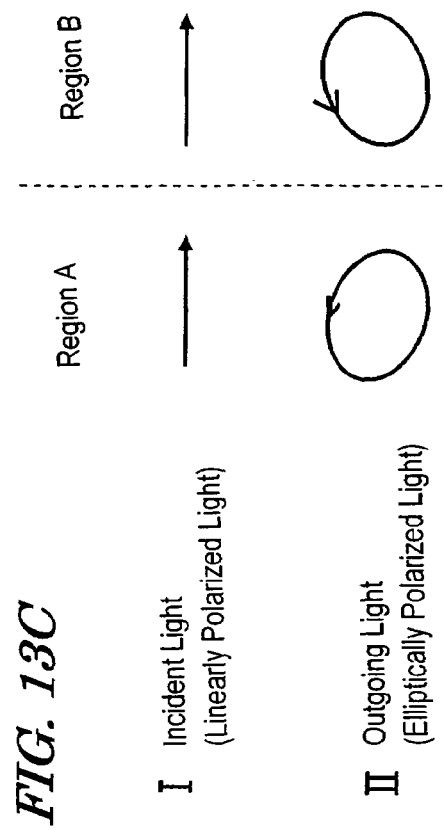
FIG. 13A is a plan view showing a wavelength plate according to the above embodiment.
Figure 13B:
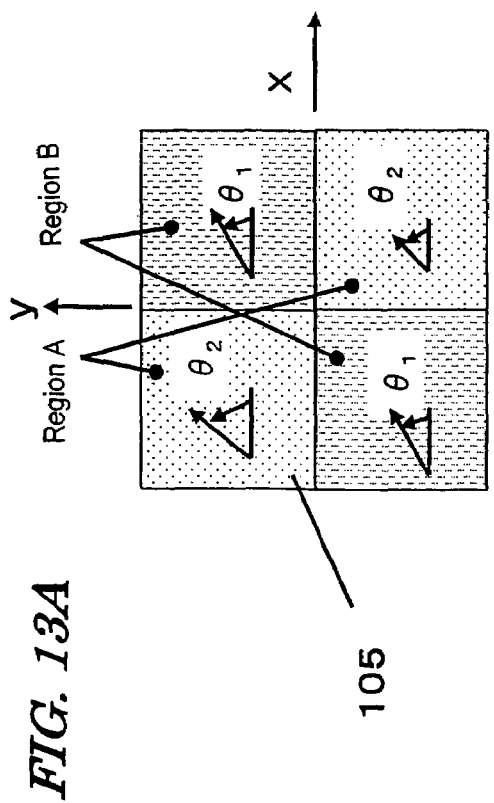
FIG. 13B is a partial side view showing an optical pickup including the wavelength plate.
Figure 13C:
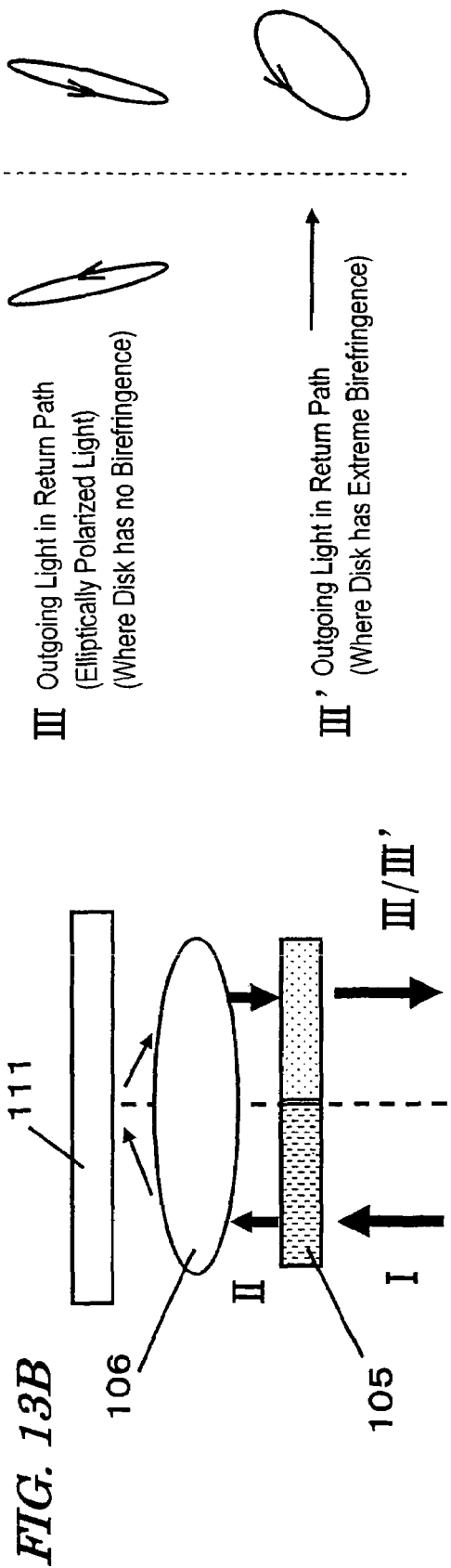
FIG. 13C is a diagram showing changes in the polarization state obtained with the use of the wavelength plate.

FIG. 13A shows a planar structure of the wavelength plate 105, whereas FIG. 13B is a diagram illustrating how the light traveling from the light source toward the optical information medium 11 and the reflected light from the optical information medium 11 are led through the wavelength plate 105. FIG. 13C is a diagram illustrating exemplary polarizations conversion by the wavelength plate 105.

As shown in FIG. 13A, the wavelength plate 105 is divided into four regions. Regions (i.e., regions A or regions B) having the same characteristics are formed at two symmetrical positions with respect to the optical axis center. The two regions A have an axis of optical anisotropy (optic axis) having an angle of $\theta_1$ with respect to the x axis direction. On the other hand, the two regions B have an axis of optical anisotropy (optic axis) having an angle of $\theta_2$ with respect to the x axis direction.

It is assumed that the linearly polarized light which enters the wavelength plate 105 from the light source side has a direction of polarization which coincides with the x axis. The angles $\theta_1$ and $\theta_2$ are 45°−α and 45°+α, respectively, with respect to the x axis direction, where 0<α≦15°. In accordance with the region splitting scheme of the present embodiment, a portion of the light from the light source 101 which travels through one of the regions A of the wavelength plate 105 is converged by the lens 106, and thereafter reflected from the optical information medium 11; then, the reflected light travels through the other region A which is at a symmetrical position with respect to the optical axis center. On the other hand, a portion of the light which travels through the one of the regions B is similarly reflected from the optical information medium 11 to travel through the other region B in the return path.

Assuming that the wavelength plate 105 has a birefringence (difference in refractive index) of Δn, a thickness of d, and a wavelength of λ, the wavelength plate 105 has a retardation of 2πΔnd/λ. If α=0, the regions A and the regions B of the wavelength plate 105 will have the same optical characteristics. In this case, if the retardation (2πΔnd/λ) of the wavelength plate 105 were set to a value which is equal to π/2, the wavelength plate 105 would serve the same function as that of a conventional ¼ wavelength plate. In other words, if linearly polarized light whose electric field vector direction is parallel to the x axis direction entered the wavelength plate 105, the linearly polarized light would be converted into circularly polarized light for output. When the light (circularly polarized light) reflected from the optical information medium 107 or 108 travels back through the wavelength plate 105 in the opposite direction, the reflected light is converted into linearly polarized light whose polarization direction coincides with the y axis direction. In the present embodiment, α is set to a value other than 0 to introduce a difference between the action of the regions A and the action of the regions B with respect to the same polarized light.

FIG. 13C shows polarization state conversion processes realized by the wavelength plate 105. Since α is not 0, if linearly polarized light I whose polarization direction coincides with the x axis direction is led through the wavelength plate 105, the linearly polarized light I is converted into elliptically polarized light which is slightly more elongated than circularly polarized light. Since the direction of the axis of optical anisotropy (optic axis) of the region A is shifted from the direction of the axis of optical anisotropy (optic axis) of the region B, the difference as shown in FIG. 13C emerges between the elliptically polarized light II obtained through the regions A and the elliptically polarized light II obtained through the regions B.

In the case where the optical information medium 107 or 108 does not have birefringence, the light (signal light) which is reflected from the optical information medium 107 or 108 is elliptically polarized light III as shown in FIG. 13C. This elliptically polarized light III is close to linearly polarized light having a polarization axis which is perpendicular to the polarization direction of the light in the forward path. If α=0, the light (signal light) reflected from the optical information medium 107 or 108 would be converted into linearly polarized light.

On the other hand, in the case where the optical information medium 107 or 108 has birefringence, polarized light III' as shown in FIG. 13C may be obtained. For example, consider a case where the light in the return path which has been led through the regions A has substantially the same polarization state as that of the light in the forward path which has exited the light source 101 and entered one of the regions A. In this case, the light in the return path will not be reflected from the polarization beam splitter 103 shown in FIG. 12, but instead return to the light source 101. However, even in such a case, the light in the return path which has been led through the regions B has a different polarization state from that of the light in the return path which has been led through the regions A. In other words, the light in the return path which has been led through the region B is in an elliptically polarized state containing S-polarized light components, which will be reflected by the polarization beam splitter 103. As a result, irrespective of the amount of birefringence of the optical information medium 107 or 108, the signal light is prevented from completely disappearing.

By using such a device, it becomes possible to realize an optical system which provides a high playability for disks having birefringence, even when adopting a so-called "polarization optical system", which is an optical system having a high transmission efficiency in the forward path and in the return path.

The reason why α is prescribed to be equal to or less than 15° in the present embodiment is that, if α were overly increased, light comprising a mixture of extremely different polarization states would be formed. Light comprising a mixture of extremely different polarization states is difficult to be converged by the lens 106 because merging two light components having greatly different polarization states results in poor coherence of light.

In the present embodiment, the directions of the two optic axes are shifted from each other by a symmetrical angle α, with respect to a direction which is at 45° from the polarization direction of incident light. In general, the birefringence (if any) of an optical disk substrate is stronger in one polarity than in the other. In this respect, an offset δ may be introduced to the center (reference) direction between the optic axes; that is, the optic axis of the regions A may be rotated by 45°+δ+α from the polarization direction of incident light, whereas the optic axis of the regions B may be rotated by 45°+δ−α from the polarization direction of incident light. In either type of regions, it is preferable to satisfy −15°≦δ≦15° in order to obtain polarization states which are as orthogonal as possible over the course of the back and forth trips of light.

Note that the number of optic axis directions assigned to the respective regions of the distribution wavelength plate is not limited to two, but may be three or more. The retardation does not need to be 90°, but may be an integer multiple of 90°, or a value obtained by adding an offset to an integer multiple of 90°. For example, if the retardation of the wavelength plate is prescribed to be a value which allows the wavelength plate to function as a ¼ wavelength plate with respect to light for DVDs (wavelength: 650 nm), then there will be a retardation which is about 650/800 of ¼ wavelength with respect to light for CDs (wavelength: 800 nm). However, by utilizing the wavelength dependence of the reflectance, etc., of the material used for the distribution wavelength plate, it becomes possible to allow the distribution wavelength plate to function substantially as a ¼ wavelength plate with respect to either type of light.

For example, assuming that the wavelength plate has an optical anisotropy of $\Delta n_1$ with respect to light for DVDs (wavelength $\lambda_1$) and an optical anisotropy of $\Delta n_2$ with respect to light for CDs (wavelength $\lambda_2$), the aforementioned condition can be satisfied by prescribing the optical parameters of the material of the wavelength plate (which may be a liquid crystal layer in the present embodiment) so that eq. 10 below holds true.

$$2\pi \Delta n_1 d/\lambda_1 = 2\pi \Delta n_2 d/\lambda_2 = \pi/2 \quad \text{(eq. 10)}$$

By prescribing such optical parameter values, the efficiency in the return path can be maximized with respect to either wavelength. Although the present embodiment illustrates an example where the light source 101 emits light for DVDs and light for CDs, the types of light to be emitted by the light source 101 are not limited thereto. Alternatively, a light source which is capable of emitting light of an even shorter wavelength, as used for Blu-ray discs, for example, may be employed.

Embodiment 6

Figure 14C:
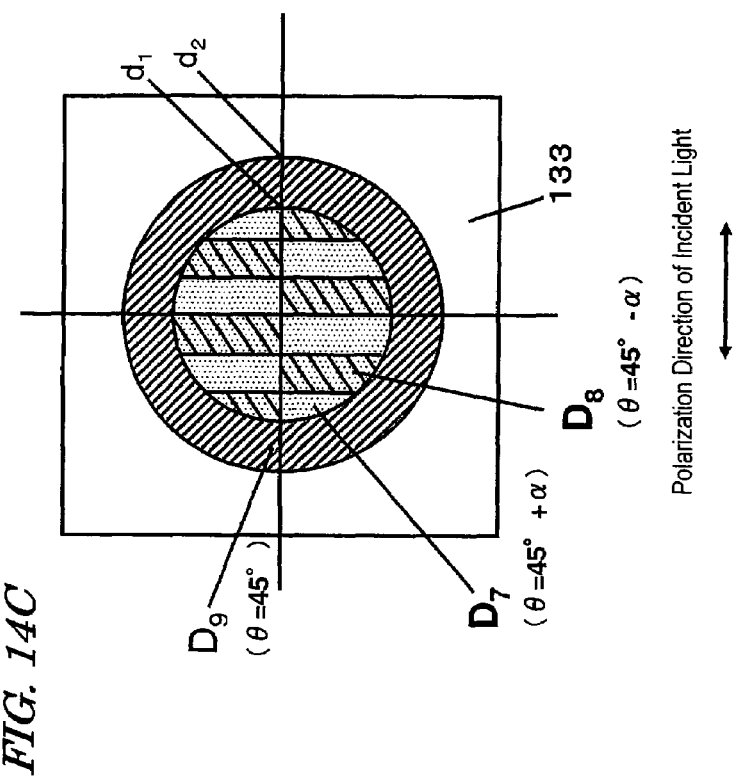
FIG. 14C is a plan view showing a wavelength plate according to still another embodiment of the present invention.
Figure 14A:
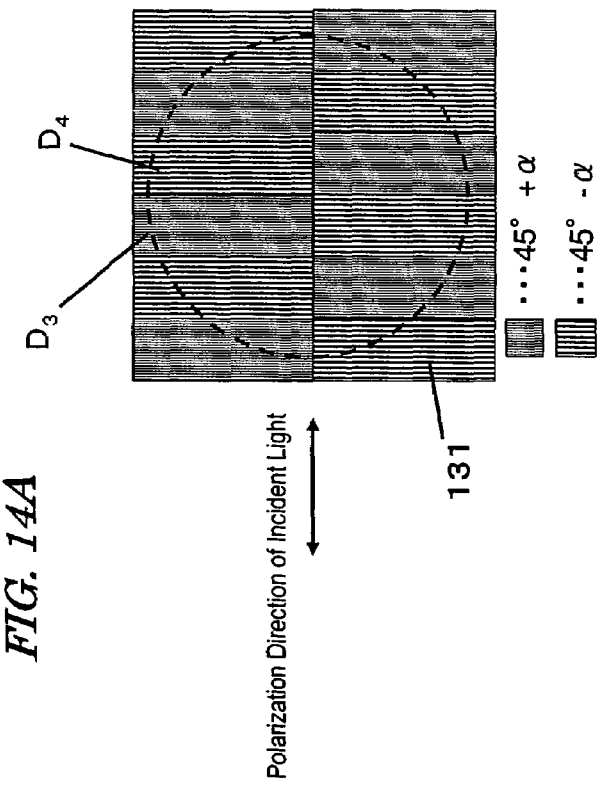
FIG. 14A is a plan view showing a wavelength plate according to another embodiment of the present invention.
Figure 14B:
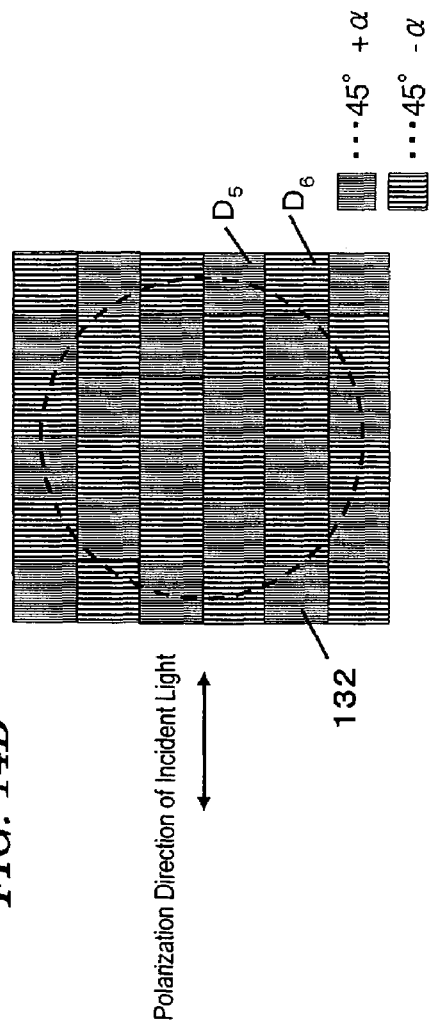
FIG. 14B is a plan view showing a wavelength plate according to still another embodiment of the present invention.

Referring to FIGS. 14A to 14C, a distribution wavelength plate according to another embodiment of the present invention will be described.

First, FIG. 14A will be referred to. A distribution wavelength plate 131 shown in FIG. 14A includes a plurality of alternating regions $D_3$ and $D_4$ each having a strip shape. The regions $D_3$ have a different optic axis direction from that of the regions $D_4$.

A distribution wavelength plate 132 shown in FIG. 14B includes rows and columns (a checker pattern) of regions $D_5$ and $D_6$. The regions $D_5$ have a different optic axis direction from that of the regions $D_6$.

In the case where the distribution wavelength plate 105 shown in FIG. 13A is used, light which is transmitted through either the regions A or the regions B will not be detected if the optical disk substrate has about the same birefringence as that of a ¼ wavelength plate. In other words, information which is contained in regions corresponding to a half of the cross section of the light beam which is transmitted through the distribution wavelength plate 105 is lost in this case. Since the regions whose information is lost in this manner are located in diagonal positions, the spatial frequency characteristics of pit images are deteriorated. Stated otherwise, image reproducibility of the minute pits present on the optical disk, as detected on the detector surface, is deteriorated. As a result, although a sufficient signal light amount can be obtained, the signal waveform may be distorted, thus rendering the reproduction performance insufficient.

However, in the case where a distribution wavelength plate as shown in FIG. 14A or 14B is employed, whose surface is divided into a multitude of finer regions, the regions in which information is lost are small and dispersed, whereby the reproduction performance can be improved.

The region splitting scheme for the distribution wavelength plate is not limited to those illustrated in FIG. 14A and FIG. 14B. As long as a plurality of regions having different optic axis directions are arranged in a two-dimensional array within the plane of the wavelength plate, the shape and size of each region may be arbitrary.

A wavelength plate 133 shown in FIG. 14C is divided into an annular region $D_9$ and an inner circular region. The circular region is further divided into strip regions $D_7$ and $D_8$, where the regions $D_7$ have a different optic axis direction from that of the regions $D_8$. The optic axis directions of the regions $D_7$ and the regions $D_8$ are set at, respectively, $45°+\alpha$ and $45°+\alpha$ with respect to the polarization direction of incident light. The annular region $D_9$ is not divided, and has an optic axis direction which is at 45° with respect to the polarization direction of incident light.

The outer diameter ($d_2$) of the annular region $D_9$ corresponds to the aperture diameter of a lens having a high NA value, which is used for optical disks of higher recording density, e.g., DVDs. On the other hand, the inner diameter ($d_1$) of the annular region $D_9$ corresponds to the aperture diameter of a lens having a low NA value, which is used for optical disks of lower recording density, e.g., CDs. By employing the distributed-type wavelength plate 133 shown in FIG. 14C, good reproduction characteristics are obtained in the case of using a low-NA lens (i.e., in the case where a medium whose substrate has a large birefringence, e.g., a CD, is used), whereas deterioration in the spatial frequency characteristics is prevented in the case of using a high-NA lens.

Embodiment 7

Figure 15:
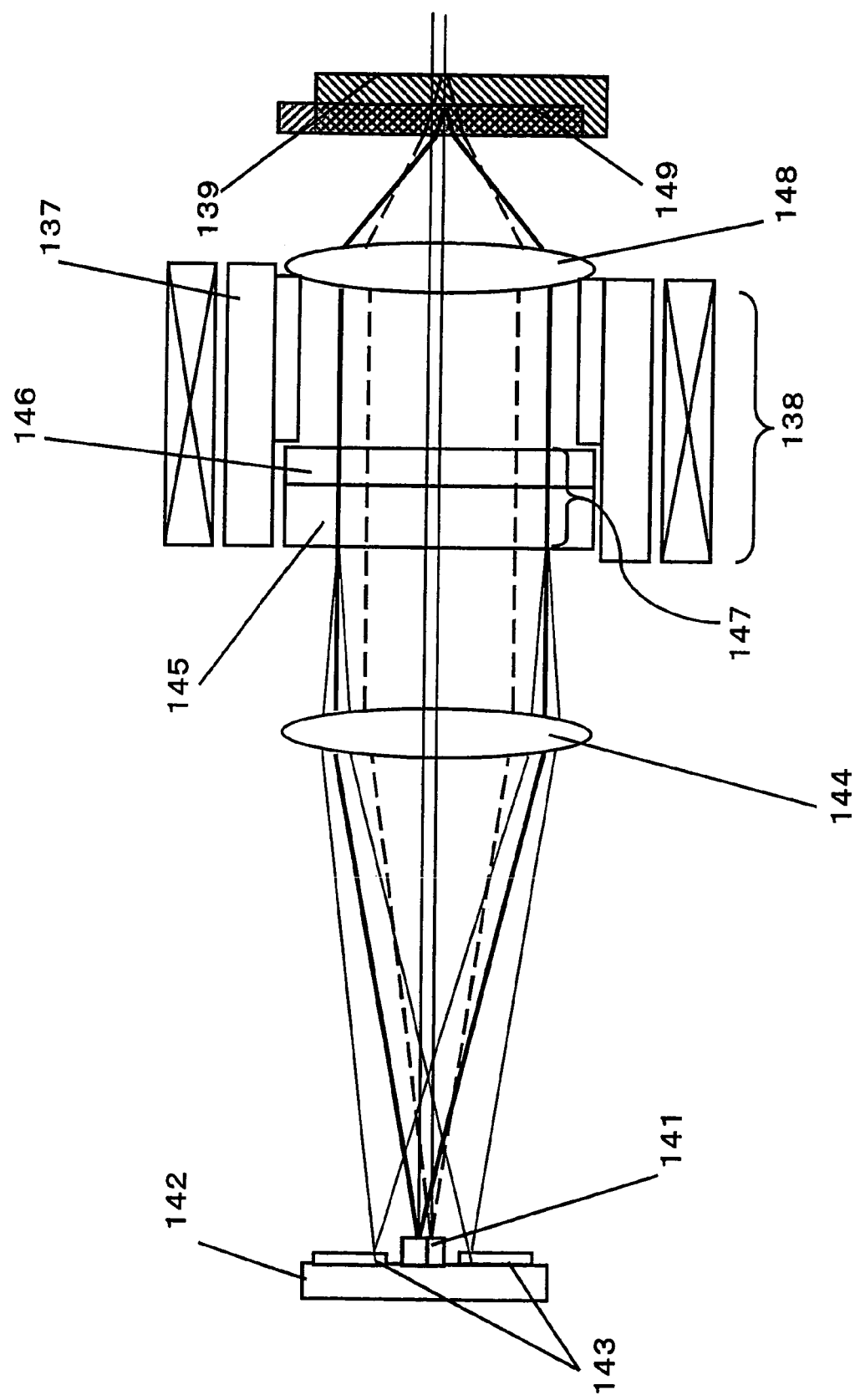
FIG. 15 is an essential structural diagram showing an optical pickup according to another embodiment of the present invention.

Referring to FIG. 15, an optical disk apparatus according to another embodiment of the present invention will be described. FIG. 15 is an essential structural diagram showing an optical pickup of the optical disk apparatus according to the present embodiment.

The optical pickup shown in FIG. 15 is capable of writing data to a plurality of types of optical disks, and/or reading data from a plurality of types of optical disks.

This device comprises a light source 141 capable of producing a plurality of light beams of different wavelengths. The light source 141 typically includes a plurality of semiconductor laser chips, but may alternatively be composed of a single semiconductor laser chip which is arranged to emit light beams of different wavelengths.

The optical pickup comprises: objective lens 148 for converging a light beam and producing a light spot on a signal surface 139 or 149 of an optical disk; a polarization hologram 145 and a wavelength plate 146 disposed between the light source 101 and the objective lens 148; and a photodetector 143 for detecting the intensity of the light beam reflected from the optical disk.

The polarization hologram 145 is disposed in a portion common to an optical path from the light source 101 to the objective lens 148 and an optical path reflecting from the optical disk signal surface 139 or 149 to the photodetector 143.

The photodetector 143 in the present embodiment is formed on a semiconductor substrate such as a silicon chip. A laser chip which emits two kinds of laser light, i.e., wavelength $\lambda_1$ and wavelength $\lambda_2$, is mounted on the substrate. The photodetector 143 is composed of a plurality of photodiodes for converting light into electrical signals by photoelectric effects. As for the laser light to be radiated by the laser chip, the wavelength $\lambda_1$ is about 650 nm, and the wavelength $\lambda_2$ is about 800 nm, for example. The laser light of the wavelength $\lambda_1$ may be used for DVDs, whereas the laser light of the wavelength $\lambda_2$ may be used for CDs, for example.

The light of the wavelength $\lambda_1$ which is emitted from the laser chip is collimated by a collimating lens 144, and thereafter transmitted through a polarization element 147. The polarization element 147 is an optical element which integrates the polarization hologram 145 and the wavelength plate 146. The polarization element 147 is attached to a supporting member 137 together with the objective lens 148, and is driven by an actuator 138 integrally with the objective lens 148. In order to facilitate the understanding of the function of the polarization element 147, a case where the wavelength plate 146 is a conventional wavelength plate which shows uniform retardation, rather than being a distribution wavelength plate, will be described first.

The light (wavelength $\lambda_1$) which has been transmitted through the polarization element 147 is converged by the objective lens 148 onto the optical disk signal surface 149, and reflected therefrom. The reflected light again goes through the objective lens 148, and is diffracted by the polarization element 147. The light which has been diffracted by the polarization element 147 goes through the collimating lens 144 and enters the photodetector 143. The photodetector 143 generates electrical signals which are in accordance with changes in the light amount. These electrical signals are a focusing control signal, a tracking control signal, and an RF signal.

On the other hand, the light of the wavelength $\lambda_2$ which has exited the laser chip is also collimated by the collimating lens 144, and is transmitted through the polarization element 147.

The light which has been transmitted through the polarization element 147 is converged by the objective lens 148 onto the signal surface 139 of an optical disk having a different substrate thickness from that of the optical disk having the signal surface 149, and reflected from the signal surface 139. The reflected light again goes through the objective lens 148, and is diffracted by the polarization element 147. The diffracted light goes through the collimating lens 144 and enters the photodetector 143. The photodetector 143 generates electrical signals which are in accordance with changes in the light amount. These electrical signals are a focusing control signal, a tracking control signal, and an RF signal.

Figure 16B:
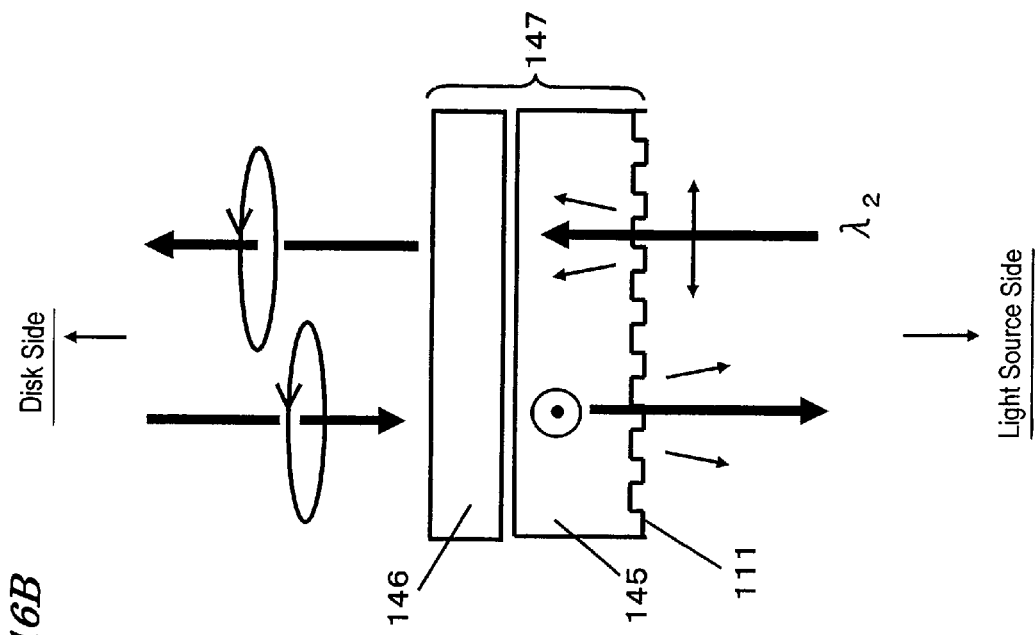
FIG. 16B is a diagram showing the conventional optical element, as well as behavior of light having a wavelength $\lambda_2$ being led therethrough.
Figure 16A:
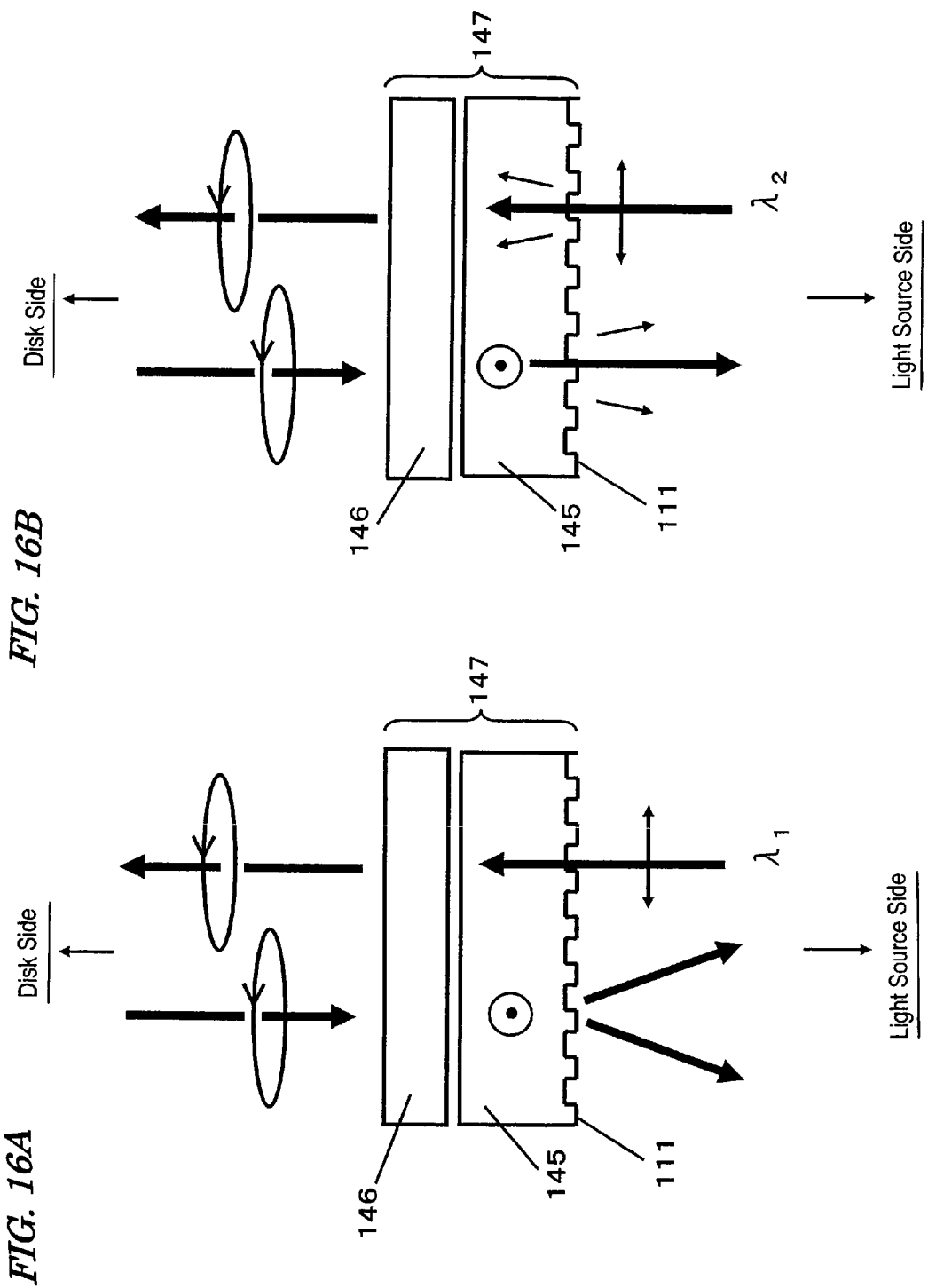
FIG. 16A is a diagram showing a conventional optical element, as well as behavior of light having a wavelength $\lambda_1$ being led therethrough.

FIGS. 16A and 16B are diagrams schematically showing polarization dependence of the diffraction which occurs when a conventional polarization element is employed as the polarization element 147 in FIG. 15. In the following description, the optical path of light traveling from the light source to the disk will be referred to as a "forward path" of the optical system, and the optical path of light reflected from the disk and traveling toward the photodetector will be referred to as a "return path" of the optical system.

FIG. 16A schematically shows cases where light of the wavelength $\lambda_1$ travels through the polarization element 147 in the forward and return paths. Light of the wavelength $\lambda_1$ which enters the polarization element 147 from the light source side (i.e., the lower side in the figure) is, for example, linearly polarized light having a polarization direction which is parallel to the plane of FIG. 16A. Such light is able to be transmitted through the polarization hologram 145 having a periodic structure 111. The periodic structure 111 of the polarization hologram 145 has polarization dependence such that, when linearly polarized light (wavelength $\lambda_1$) whose polarization direction is parallel to the plane of FIG. 16A is transmitted through the polarization hologram 145, a phase difference of $2N\pi$ (where N is an integer other than 0) occurs in the transmitted light, depending on the incident position on the periodic structure 111. The polarization hologram 145 is quite different from a generally-used conventional polarization hologram in that N is not zero. Since the periodic phase difference occurring in the light transmitted through the polarization hologram 145 is equal to an integer multiple of $2\pi$ (i.e., any optical path difference occurring in the polarization hologram 145 is equal to an integer multiple of the wavelength $\lambda_1$), according to the diffraction principle of light, a condition stipulating absence of diffraction through the periodic structure 111 (a perfect transmission condition) is satisfied with respect to light of the wavelength $\lambda_1$.

The light which has thus been transmitted through the polarization hologram 145 then travels through the wavelength plate 146. The wavelength plate 146 functions as a 5/4 wavelength plate with respect to light of the wavelength $\lambda_1$ (650 nm). Therefore, linearly polarized light of the wavelength $\lambda_1$ is converted by the wavelength plate 146 into circularly polarized light.

The light (circularly polarized light) which has been reflected back by the optical disk (not shown) is converted into linearly polarized light by the wavelength plate 146. The polarization direction (which is perpendicular to the plane of FIG. 16A) of this linearly polarized light is perpendicular to the polarization direction of the light which has entered the polarization hologram 145 from the light source side. To such linearly polarized light, the periodic structure 111 of the polarization hologram 145 periodically imparts a phase difference of $(2M+1)\pi$ (where M is an integer) depending on the incident position. Therefore, the linearly polarized light is completely diffracted, according to the diffraction principle of light. In theory, assuming that a phase difference of $\phi$ is caused by the periodic structure of the hologram, a transmittance T for the $0^{th}$ order light traveling through the hologram is expressed by eq. 11 below.

$$T=\cos^2(\phi/2) \qquad \text{(eq. 11)}$$

If the phase difference $\phi$ is $(2M+1)\pi$, it follows that T=0, that is, the perfect diffraction condition is satisfied.

Next, with reference to FIG. 16B, the operation of the conventional polarization element 147 with respect to the light of the wavelength $\lambda_2$ will be described. As shown in FIG. 16B, when the light of the wavelength $\lambda_2$ (linearly polarized light whose polarization direction is parallel to the plane of FIG. 16B) entering the polarization hologram 145 from the light source is incident to the polarization element 147, a phase difference of about $2N\pi\lambda_1/\lambda_2$ is caused by the periodic structure 111 of the polarization hologram 145. Since N is not 0, the phase difference caused is not zero. Moreover, assuming that $\lambda_1$=650 nm and $\lambda_2$=800 nm, the value of N must be set quite high in order to make $N\lambda_1/\lambda_2$ an integer. Therefore, the polarization hologram 145 deviates from the perfect transmission condition, so that light of the wavelength $\lambda_2$ is partially diffracted.

Assuming that $\lambda_1$=650 nm (light of the wavelength for DVDS); $\lambda_2$=800 nm (light of the wavelength for CDs); and N=1, the transmission efficiency of the non-diffracted light ($0^{th}$ order light) is expressed by eq. 12 below.

$$\cos^2((2\pi\lambda_1/\lambda_2)/2)=\cos^2((2\pi \times 650/800)/2)=69\% \qquad \text{(eq. 12)}$$

From eq. 12, it can be seen that about 31% of the incident light is diffracted by the polarization hologram 145.

The light of the wavelength $\lambda_2$ which has thus been transmitted through the polarization hologram 145 next travels through the wavelength plate 146. Since the wavelength plate 146 is a 5/4 wavelength plate with respect to light of the wavelength $\lambda_1$ (650 nm), the wavelength plate 146 functions substantially as a 1 wavelength plate with respect to light of the wavelength $\lambda_2$ (800 nm). Therefore, the linearly polarized light of the wavelength $\lambda_2$ passes through the wavelength plate 146 without being subjected to polarization conversion by the wavelength plate 146.

On the other hand, since the light of the wavelength $\lambda_2$ returned from the optical disk is not subjected to polarization conversion by the wavelength plate 146 any more than in the forward path, a phase difference of $2N\pi\lambda_1/\lambda_2$ is similarly caused by the periodic structure 111 of the polarization hologram 145. Therefore, between light of the wavelength $\lambda_1$ and light of the wavelength $\lambda_2$, it would be impossible to set diffracted light for both light to be 0, unless the light having the relatively greater wavelength equals an integer multiple (twice, three times, . . . etc.) of the wavelength of the other light.

Assuming that $\lambda_1$=650 nm (light for DVDs); $\lambda_2$=800 nm (light for CDs); and M=1, the diffraction efficiencies of the $\pm 1^{st}$ order diffracted light are expressed by eq. 13 below.

$$(2/\pi)^2 \times \cos^2((\pi\lambda_1/\lambda_2)/2)=\cos^2((\pi \times 650/800)/2)=8.4\% \qquad \text{(eq. 13)}$$

Any light other than the $\pm 1^{st}$ order diffracted light is mostly transmitted through the diffraction grating as $0^{th}$ order light.

The above diffraction efficiency for the $1^{st}$ order diffracted light would be true if the disk substrate did not have any birefringence so that the substrate would exert no polarization influence. Note that, when the substrate of the CD has the highest birefringence, i.e., a birefringence substantially equivalent to that of a ¼ wavelength plate, the linearly polarized light is in a direction perpendicular to that when entering. Since the diffraction efficiency of the $\pm 1^{st}$ order diffracted light in this case satisfies the perfect diffraction condition, the light amount of the signal light will be more increased than decreased. In other words, the amount of returned light may vary depending on various polarization states, but is non-zero even in the worst cases.

Light of the wavelength $\lambda_1$ is used for optical disks (such as DVDs) whose substrate thickness is so thin that substrate birefringence is not likely to occur during the production process but which require a short wavelength and thus hinder high-power implementation. The use of such a polarization element makes it possible to attain a high efficiency with respect to light of the wavelength $\lambda_1$. On the other hand, light of the wavelength $\lambda_2$ is used for optical disks (such as CDs) for which a sufficient light amount can be secured with a high-power laser (which in itself is relatively easy to produce) notwithstanding a low efficiency but which have such a large substrate thickness that products having a large amount of optical birefringence are likely to be formed during the production process. With respect to light of the wavelength $\lambda_2$, the use of such a polarization element ensures that the signal level does not become zero even if the polarization state of the returned light from the disk has been changed due to the birefringence of the disk substrate, whereby stable signal reproduction and control can be performed.

Moreover, the use of such a polarization element also makes it possible to realize, in a compact construction, an optical pickup which supports optical storage media of different standards. The reason is that, while independent beam splitters corresponding to different wavelengths have conventionally been used (from the aforementioned perspective) to guide light from a disk to the photodetector, the use of the aforementioned polarization element realizes the same function with the use of a single hologram. As a result, the optical path from the laser light source to the optical storage medium (forward path) and the optical path from the optical storage medium to the photodetector (return path) can be entirely unified, whereby the number of elements in the optical system can be reduced, and the optical system can be accommodated in a small space.

According to the present embodiment, in a device having the above-described structure, a distributed-type wavelength plate 146 is used in the place of the wavelength plate 146 having a uniform retardation as shown in FIGS. 16A and 16B.

With respect to the polarization direction of the light from the laser light source 141, the polarization hologram 145 does not diffract light of either wavelength in the forward path of the optical system. Therefore, transmission efficiency losses are prevented, and the incident light is converted by the distribution wavelength plate 146 into substantially circularly polarized light, which is then converged onto the optical disk signal surface 139 or 149. By being reflected from the optical disk signal surface 139 or 149 and going again through the distribution wavelength plate 146 in the return path, light of either wavelength becomes light whose main axis of polarization is substantially in a direction perpendicular to the polarization direction in the forward path. By being led through the polarization hologram 145, light of different wavelengths can both be diffracted by the polarization hologram 145 with a high efficiency, so as to be led to the photodetector 143. In this case, the amount of signal light depends on the polarization diffraction direction components of the hologram. Therefore, when an optical disk having a large birefringence is used, in the very worst case, the signal light amount may become zero if the conventional, uniform wavelength plate is employed. According to the present embodiment, however, the use of the distribution wavelength plate 146 provides adequate countermeasures against the birefringence of the optical disk, while maintaining a high efficiency in the forward path.

Figure 17A:
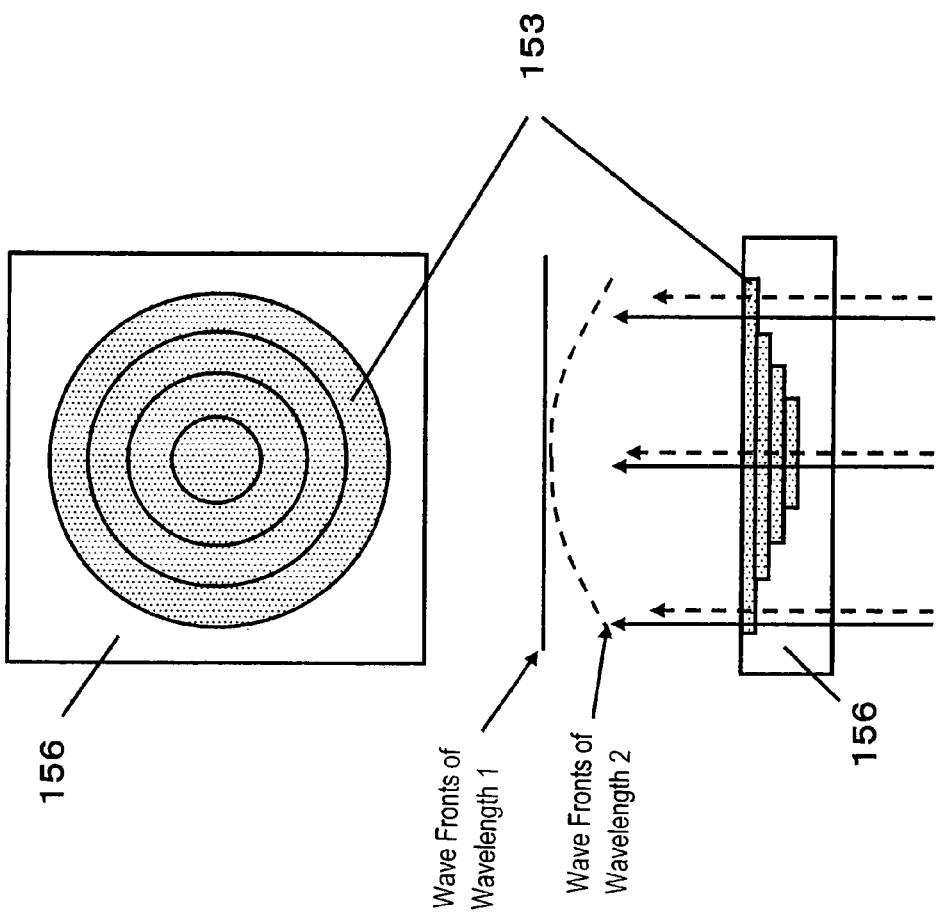
FIG. 17A includes a plan view and a side view of an optical element according to another embodiment of the present invention.
Figure 17B:
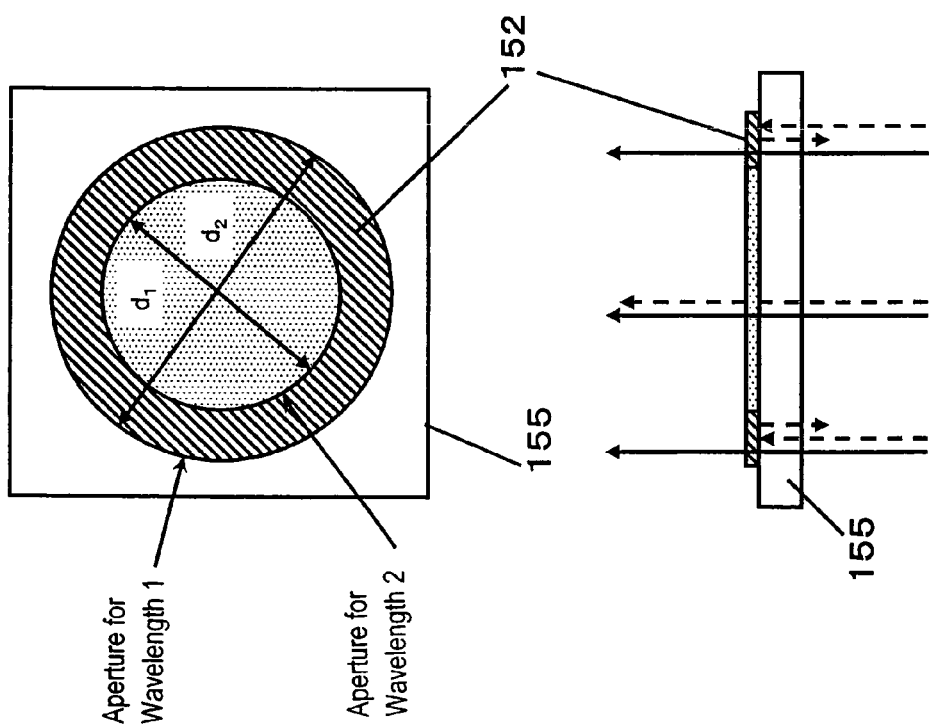
FIG. 17B includes a plan view and a side view of an optical element according to still another embodiment of the present invention.

Through a thin film formation/processing procedure such as vapor deposition, sputtering, or etching, a thin film structure may be formed on the distribution wavelength plate 146. For example, as shown in FIG. 17A, a transmittance filter 152 providing different aperture sizes for light of different wavelengths may be formed on the distribution wavelength plate 155. Moreover, as shown in FIG. 17B, for disks having different substrate thicknesses, light of one of the wavelengths may be transmitted in the form of plane waves, whereas light of the other wavelength may be diffused, and the spherical aberration which occurs due to the different substrate thicknesses may be corrected by a phase filter 153 formed on the distribution wavelength plate 156. By adopting such a structure, the optical pickup can be further downsized.

Embodiment 8

Next, referring to FIGS. 18A to 18D, one embodiment of a method for producing a distribution wavelength plate which can be suitably used in each of the above embodiments will be described.

Figure 18C:
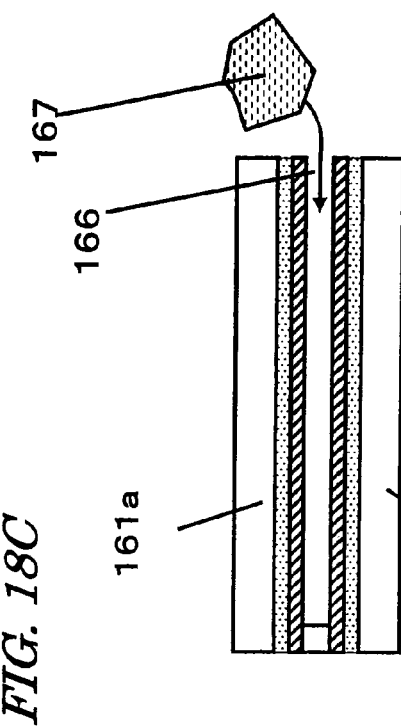
FIGS. 18A, 18B, 18C, and 18D are diagrams showing one embodiment of a method for producing a distribution wavelength plate according to the present invention.
Figure 18D:
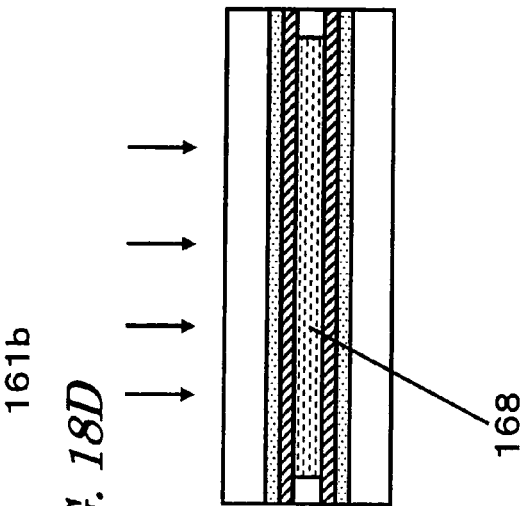
Figure 18A:
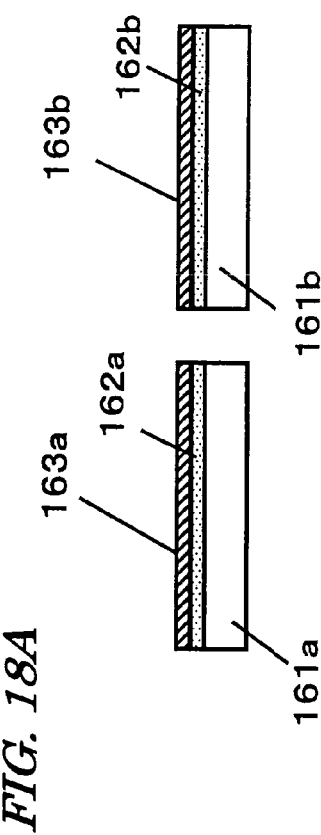

First, as shown in FIG. 18A, transparent substrates 161*a* and 161*b* on which transparent electrode films 162*a* and 162*b* (made of ITO), respectively, are formed are prepared. An alignment material is applied onto the transparent conductive films 162*a* and 162*b*, thus forming liquid crystal alignment films 163*a* and 163*b*, respectively. As the alignment material, a photo-alignable material is used which, when irradiated with linearly-polarized ultraviolet rays and subjected to an exposure, acquires an alignment in the polarization direction.

Figure 18B:
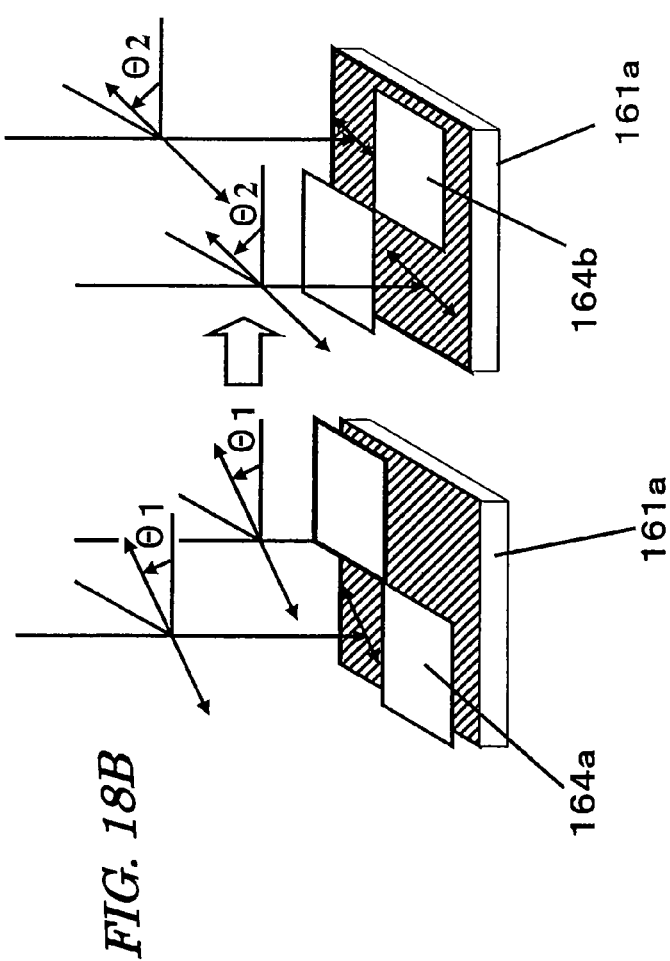
Figures 19A, 19B:
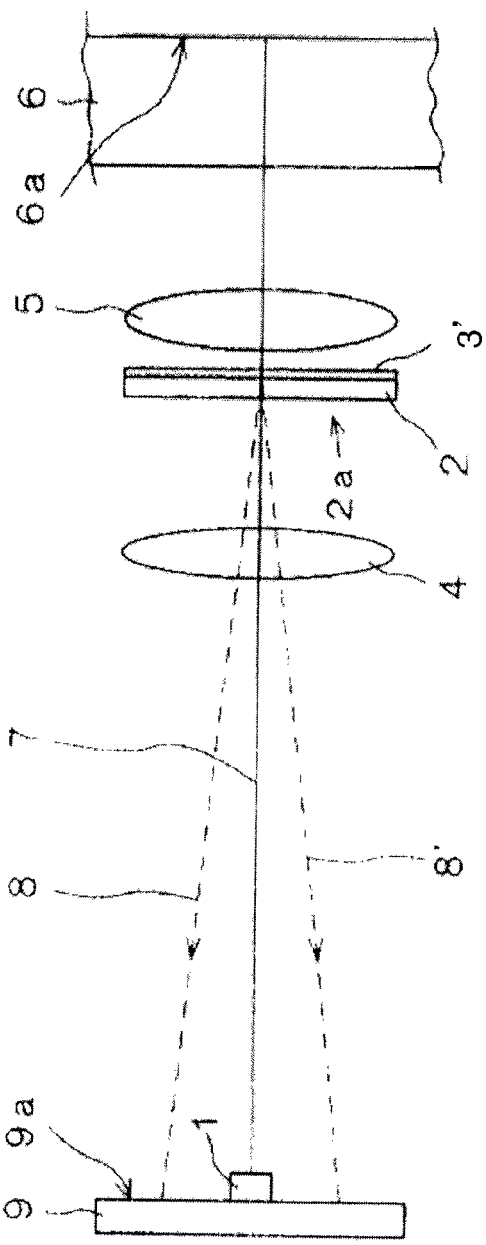
FIG. 19A is an essential structural diagram showing a conventional optical disk apparatus.
FIG. 19B is a side view showing a light source section thereof.

Next, as shown in FIG. 18B, when forming regions having an optic axis in the direction defined by the angle $\theta_1$, the transparent substrate 161*a* (or 161*b*) is irradiated with ultraviolet rays while covering the other regions with a mask 164*a*, the ultraviolet rays being linearly polarized in the direction defined by the angle $\theta_1$. On the other hand, when forming regions having an optic axis in the direction defined by the angle $\theta_2$, the transparent substrate 161*a* (or 161*b*) is irradiated with ultraviolet rays while covering the other regions with a mask 164*b*, the ultraviolet rays being linearly polarized in the direction defined by the angle $\theta_2$.

Next, as shown in FIG. 18C, the transparent substrate 161*a* and the transparent substrate 161*b* are placed so as to oppose each other, and after the peripheries are attached by means of an adhesive, a liquid crystal material 167 containing a UV-curing resin is injected into the interior, through an aperture 166. Once the liquid crystal material 167 is injected, the longer axis of each liquid crystal molecule will be aligned in accordance with the alignment directions of the liquid crystal alignment films 163*a* and 163*b*.

In order to further enhance the alignment uniformity of the liquid crystal layer 168, it is preferable to apply a voltage between the transparent electrode films 162*a* and 162*b*, thus creating an electric field across the liquid crystal layer 168. In the case where no such electric field is to be applied, the transparent electrode films 162*a* and 162*b* may be omitted.

Next, as shown in FIG. 18D, the liquid crystal layer 168 with irradiated with unpolarized ultraviolet rays, thus curing the liquid crystal layer 168.

Alignment restriction for a liquid crystal layer is typically performed by rubbing the surface of the alignment film in a predetermined direction, with a cloth on which fine fibers, e.g., polyamide type synthetic fibers, are formed. However, the present embodiment adopts an optical alignment technique in order to obtain different alignment directions within the same plane. By using such an optical alignment technique, it is possible to obtain a desired alignment distribution. Note that at least one of the transparent conductive films 162a and 162b may be patterned in accordance with the division pattern of the regions. By thus patterning the transparent conductive film 162a and/or 162b, it becomes possible to apply different voltages to different regions, thus facilitating a region-by-region control of the alignment state.

According to the present invention, it is possible to obtain a necessary amount of detected light, irrespective of the birefringence of an optical disk substrate. Therefore, it is possible to support various types of optical disks.

Moreover, an optical pickup according to the present invention can be used for a plurality of different types of optical storage medium, and therefore is suitably used for recording-type optical disk apparatuses (e.g., CDs, DVDs, or Blu-ray discs) which need to be reduced in size and cost.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2004-127855 filed Apr. 23, 2004, No. 2004-133108 filed Apr. 28, 2004, and No. 2005-121245 filed Apr. 19, 2005, the entire contents of which are hereby incorporated by reference.

What is claimed is:

1. An optical disk apparatus comprising:
   a light source for emitting light;
   an objective lens for converging the light onto a signal surface of an optical disk;
   a polarized beam diffraction element for diffracting the light reflected from the optical disk;
   a photodetector for detecting the light diffracted from the polarized beam diffraction element; and
   a wavelength plate disposed between the optical disk and the polarized beam diffraction element, wherein,
   the wavelength plate has a two-dimensional array of a plurality of birefringent regions including first and second regions, the first and second regions differing in birefringent phase difference and/or optic axes from each other, and the plurality of birefringent regions including the first and second regions cause the light to have different polarization states.

2. The optical disk apparatus according to claim 1, wherein optic axes of the first and second regions of the wavelength plate are oriented in different directions from each other.

3. The optical disk apparatus according to claim 1, wherein the first region has a birefringent phase difference of $\lambda/4+\alpha$ and the second region has a birefringent phase difference of $\lambda/4-\alpha$, where $\lambda$ is a wavelength of the light emitted from the light source.

4. The optical disk apparatus according to claim 1, wherein the first region has a birefringent phase difference of $\lambda/4+\alpha$ and the second region has a birefringent phase difference of $-3\lambda/4-\alpha$, where $\lambda$ is a wavelength of the light emitted from the light source.

5. The optical disk apparatus according to claim 3, wherein $\alpha$ is in a range of $-\lambda/8<\alpha<\lambda/8$.

6. The optical disk apparatus according to claim 1, wherein a plurality of said first regions and a plurality of said second regions alternate on the wavelength plate, each first region and each second region having a strip shape.

7. The optical disk apparatus according to claim 1, wherein the light source is capable of emitting first laser light of a wavelength $\lambda 1$ and second laser light of a wavelength $\lambda 2$ (where $\lambda 2 > \lambda 1$).

* * * * *